US012713447B2

(12) United States Patent
Wei et al.

(10) Patent No.: US 12,713,447 B2
(45) Date of Patent: Aug. 18, 2026

(54) DCI ENHANCEMENTS FOR SOFT RESOURCE AVAILABILITY INDICATION

(71) Applicant: Intel Corporation, Santa Clara, CA (US)

(72) Inventors: Lili Wei, Portland, OR (US); Qian Li, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 388 days.

(21) Appl. No.: 18/580,201

(22) PCT Filed: Aug. 4, 2022

(86) PCT No.: PCT/US2022/039421

§ 371 (c)(1),
(2) Date: Jan. 18, 2024

(87) PCT Pub. No.: WO2023/014884

PCT Pub. Date: Feb. 9, 2023

(65) Prior Publication Data

US 2024/0349309 A1 Oct. 17, 2024

Related U.S. Application Data

(60) Provisional application No. 63/230,646, filed on Aug. 6, 2021.

(51) Int. Cl.
*H04W 72/29* (2023.01)
*H04W 72/044* (2023.01)
(Continued)

(52) U.S. Cl.
CPC ......... *H04W 72/29* (2023.01); *H04W 72/044* (2013.01); *H04W 72/232* (2023.01); *H04W 88/085* (2013.01)

(58) Field of Classification Search
CPC . H04W 48/16; H04W 72/044; H04W 72/232; H04W 36/0064; H04W 12/08
See application file for complete search history.

(56) References Cited

U.S. PATENT DOCUMENTS

| | | | | |
|---|---|---|---|---|
| 11,438,817 | B2 * | 9/2022 | You | H04B 7/024 |
| 11,832,140 | B2 * | 11/2023 | Akl | H04W 36/0064 |

(Continued)

FOREIGN PATENT DOCUMENTS

| | | | | | |
|---|---|---|---|---|---|
| AU | 2022228745 | A1 * | 8/2023 | | H04L 5/0051 |
| CN | 111757486 | A * | 10/2020 | | H04W 72/21 |

(Continued)

OTHER PUBLICATIONS

J. Kim, I. Kim and H. Chung, "Resource Multiplexing Enhancements for Integrated Access and Backhaul in 5G New Radio Release 17," 2020 International Conference on Information and Communication Technology Convergence (ICTC), Jeju, Korea (South), 2020, pp. 936-938, doi: 10.1109/ICTC49870.2020.9289417. (Year: 2020).*

(Continued)

*Primary Examiner* — William D Cumming
(74) *Attorney, Agent, or Firm* — Schwegman Lundberg & Woessner, P.A.

(57) ABSTRACT

An apparatus for an Integrated Access and Backhaul (IAB) node includes processing circuitry coupled to a memory. To configure the IAB node for resource availability indication in an IAB network, configuration signaling received from a CU function of an IAB donor node is decoded at a DU function of the IAB node. The configuration signaling configures a frequency-domain hard, soft, and not available (H/S/NA) resource application for a plurality of resource types. DCI received from a P-DU function of a parent IAB node is decoded at an MT function of the IAB node. The DCI includes an availability indicator for at least one soft resource region associated with the frequency-domain H/S/

(Continued)

NA resource application. A downlink transmission by the DU function of the IAB node to a C-MIT function of a child IAB node is configured using the at least one soft resource region based on the availability indicator.

20 Claims, 14 Drawing Sheets

(51) Int. Cl.
*H04W 72/232* (2023.01)
*H04W 88/08* (2009.01)

(56) References Cited

U.S. PATENT DOCUMENTS

| | | | | |
|---|---|---|---|---|
| 12,537,649 | B2 * | 1/2026 | Ghanbarinejad | H04B 7/15528 |
| 12,557,077 | B2 * | 2/2026 | You | H04W 72/044 |
| 2021/0105683 | A1 * | 4/2021 | You | H04B 7/024 |
| 2021/0345206 | A1 * | 11/2021 | Akl | H04W 48/16 |
| 2023/0309067 | A1 * | 9/2023 | You | H04W 72/044 |
| 2024/0114496 | A1 * | 4/2024 | Huang | H04W 72/232 |
| 2024/0146480 | A1 * | 5/2024 | Ghanbarinejad | H04B 7/15528 |
| 2024/0243797 | A1 * | 7/2024 | Åström | H04B 7/024 |
| 2024/0349309 | A1 * | 10/2024 | Wei | H04W 72/29 |
| 2025/0331005 | A1 * | 10/2025 | Ghanbarinejad | H04W 72/044 |
| 2026/0067787 | A1 * | 3/2026 | Zhu | H04W 12/08 |

FOREIGN PATENT DOCUMENTS

| | | | | | |
|---|---|---|---|---|---|
| CN | 115486125 | A | * | 12/2022 | H04W 48/16 |
| CN | 116438835 | A | * | 7/2023 | H04W 36/0005 |
| CN | 116783967 | A | * | 9/2023 | H04W 72/044 |
| CN | 117796102 | | | 3/2024 | |
| CN | 117796102 | A | * | 3/2024 | H04W 72/044 |
| CN | 118945897 | A | * | 11/2024 | H04W 36/083 |
| CN | 115486125 | B | * | 5/2025 | H04W 36/0064 |
| CN | 111757486 | B | * | 9/2025 | H04W 72/23 |
| EP | 3827639 | B1 | * | 1/2025 | H04W 88/085 |
| EP | 4697853 | A1 | * | 2/2026 | H04W 36/083 |
| JP | 2022510257 | A | * | 1/2022 | H04W 72/20 |
| JP | 2024530915 | A | * | 8/2024 | H04W 76/11 |
| JP | WO2023078780 | A5 | * | 4/2025 | |
| KR | 20210120767 | A | * | 10/2021 | H04W 88/085 |
| KR | 20220158026 | A | * | 11/2022 | H04W 84/047 |
| KR | 20230091856 | A | * | 6/2023 | H04W 92/04 |
| KR | 20230165802 | A | * | 12/2023 | H04B 7/15542 |
| KR | 102893229 | B1 | * | 12/2025 | H04W 72/232 |
| KR | 20260007259 | A | * | 1/2026 | H04W 84/047 |
| WO | WO-2023014131 | A1 | * | 2/2002 | H04L 5/0092 |
| WO | WO-2020144654 | A1 | * | 7/2020 | H04B 7/15542 |
| WO | WO-2020205607 | A1 | | 10/2020 | |
| WO | WO-2021005456 | A1 | * | 1/2021 | H04W 76/11 |
| WO | WO-2021222100 | A1 | * | 11/2021 | H04W 36/0064 |
| WO | WO-2022031114 | A1 | * | 2/2022 | H04W 84/047 |
| WO | WO-2022153272 | A1 | * | 7/2022 | H04W 72/20 |
| WO | WO-2022154701 | A1 | * | 7/2022 | H04B 7/15542 |
| WO | WO-2022185252 | A1 | * | 9/2022 | H04B 7/15528 |
| WO | WO-2022207002 | A1 | * | 10/2022 | H04W 72/0446 |
| WO | WO-2022238308 | A1 | * | 11/2022 | H04B 7/024 |
| WO | WO-2023014884 | A1 | * | 2/2023 | H04W 72/044 |
| WO | WO-2023078780 | A1 | * | 5/2023 | H04L 5/0005 |
| WO | WO-2023088903 | A1 | * | 5/2023 | H04W 72/0453 |
| WO | WO-2023148705 | A1 | * | 8/2023 | H04W 40/02 |
| WO | WO-2024167334 | A1 | * | 8/2024 | H04L 5/1469 |
| WO | WO-2024230369 | A1 | * | 11/2024 | H04W 76/10 |
| WO | WO-2024231868 | A1 | * | 11/2024 | H04W 24/02 |

OTHER PUBLICATIONS

"International Application Serial No. PCT/US2022/039421, International Search Report mailed Nov. 22, 2022", 3 pgs.

"International Application Serial No. PCT/US2022/039421, Written Opinion mailed Nov. 22, 2022", 5 pgs.

Qualcomm Incorporated, "Resource management for enhanced duplexing", R1-2104691, 3GPP TSG RAN WG1 Meeting #105-e, (May 12, 2021), 9 pgs.

Qualcomm Incorporated, "Resource management for enhanced duplexing", R1-2103183, 3GPP TSG RAN WG1 Meeting #104bis-e, (Apr. 7, 2021), 9 pgs.

ZTE, et al., "Consideration on reference carrier for semi-static IAB-DU resource configuration", R1-2104879, 3GPP TSG RAN WG1 Meeting #105-e, (May 12, 2021), 2 pgs.

ZTE, et al., "Enhancements to the IAB resource multiplexing", R1-2104877, 3GPP TSG RAN WG1 Meeting #105-e, (May 12, 2021).

"3GPP TSG RAN NR Study on Integrated Access and Backhaul Release 16',", 3GPP TR 38.874 V16.0.0, Dec. 2018, 1-111.

"International Application Serial No. PCT US2022 039421, International Preliminary Report on Patentability mailed Feb. 15, 2024", 7 pgs.

"U.S. Appl. No. 18/580,201, Supplemental Preliminary Amendment filed Jun. 27, 2024", 8 pages.

"Chinese Application Serial No. 202280054772.6 , Voluntary Amendment Filed Aug. 6, 2024", w English Claims, 9 pgs.

"5G NR Physical layer procedures for control", 3GPP TS 38.213 version 16.3.0 Release 16, Nov. 2020, 181 pages.

"RAN1 Chairs Notes", 3GPP TSG RAN WG1 Meeting #105ee-Meeting, May 10-27, 2021, May 27, 2021, 44 pages.

"New WID on Enhancements to Integrated Access and Backhaul", 3GPP Tsg Ran Meeting 88eMeeting, Jun. 29 Jul. 3, 2020, 5 pages.

* cited by examiner

DCI ENHANCEMENTS FOR SOFT RESOURCE AVAILABILITY INDICATION

PRIORITY CLAIM

This application is a U.S. National Stage Filing under 35 U.S.C. 371 from International Application No. PCT/US2022/039421, filed Aug. 4, 2022 and published in English as WO 2023/014884 on Feb. 9, 2023, which claims the benefit of priority to U.S. Provisional Patent Application 63/230,646, filed Aug. 6, 2021, and entitled "DOWNLINK CONTROL INFORMATION ENHANCEMENTS FOR FREQUENCY-DOMAIN SOFT RESOURCE AVAILABILITY INDICATION," each of which patent application is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, (MulteFire, LTE-U), and fifth-generation (5G) networks including 5G new radio (NR) (or 5G-NR) networks, 5G-LTE networks such as 5G NR unlicensed spectrum (NR-U) networks, Integrated Access and Backhaul (IAB) networks, and other unlicensed networks including Wi-Fi, CBRS (OnGo), etc. Other aspects are directed to techniques for downlink control information (DCI) enhancements for frequency-domain soft resource availability indication in wireless networks including IAB networks.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in many disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As the current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. Further enhanced operation of LTE and NR systems in the licensed, as well as unlicensed spectrum, is expected in future releases and 5G systems. Such enhanced operations can include techniques for DCI enhancements for frequency-domain soft resource availability indication in wireless networks including IAB networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
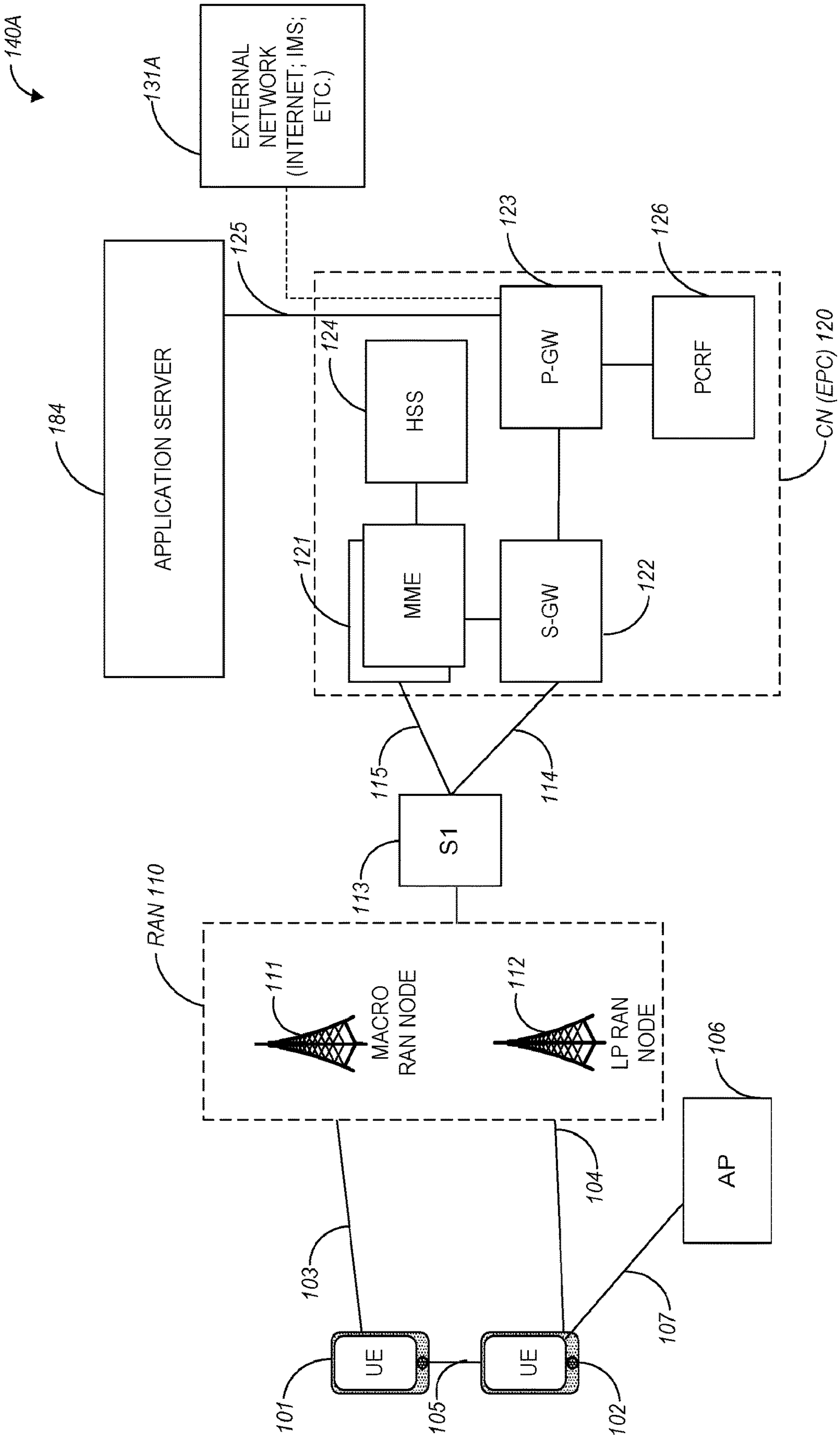
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHZ, 3.4-3.6 GHZ, 3.6-3.8 GHz, and further frequencies and Spectrum Access System (SAS) in 3.55-3.7 GHZ and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe), or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, a Universal Mobile Telecommunications System (UMTS), an Evolved Universal Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. Connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable connections 103 and 104. These access nodes (ANs) can be referred to as base stations (BSs), NodeBs, evolved NodeBs (eNBs), Next Generation NodeBs (gNBs), RAN network nodes, and the like, and can comprise ground stations (e.g., terrestrial access points) or satellite stations providing coverage within a geographic area (e.g., a cell). In some aspects, communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112 or an unlicensed spectrum based secondary RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management, and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries user traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, the capacity of the equipment, the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and route data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including a 5G new radio network using communications in the licensed (5G NR) and the unlicensed (5G NR-U) spectrum. One of the current enablers of IoT is the narrowband IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-December). In some aspects, each of the gNBs and the NG-eNBs can be implemented as a base station, a mobile edge server, a small cell, a home eNB, a RAN network node, and so forth. In some aspects, a gNB can be a master node (MN) and NG-eNB can be a secondary node (SN) in a 5G architecture. In some aspects, the master/primary node may operate in a licensed band and the secondary node may operate in an unlicensed band.

Figure 1B:
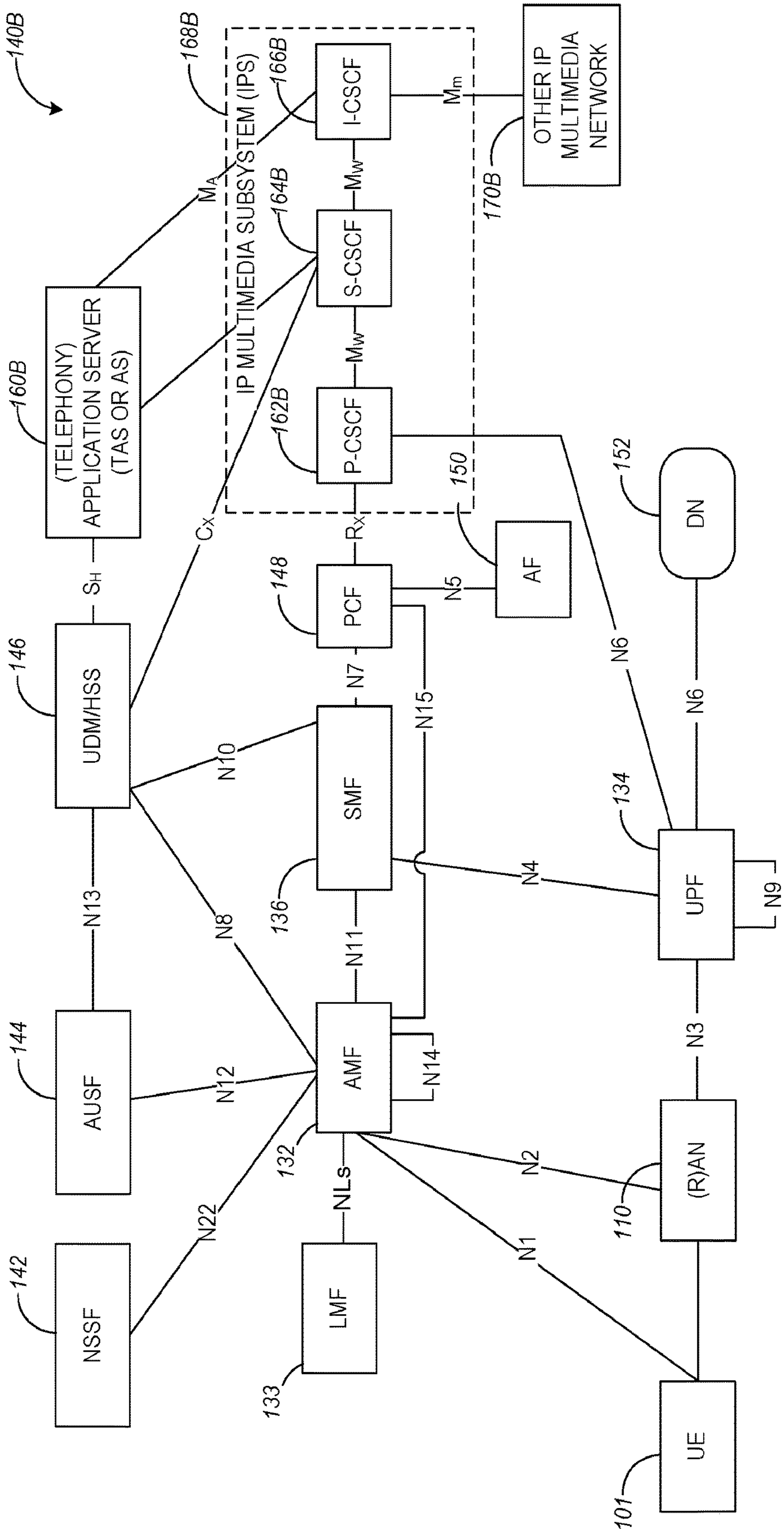
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, location management function (LMF) 133, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The LMF 133 may be used in connection with 5G positioning functionalities. In some aspects, LMF 133 receives measurements and assistance information from the next generation radio access network (NG-RAN) 110 and the mobile device (e.g., UE 101) via the AMF 132 over the NLs interface to compute the position of the UE 101. In some aspects, NR positioning protocol A (NRPPa) may be used to carry the positioning information between NG-RAN and LMF 133 over a next generation control plane interface (NG-C). In some aspects, LMF 133 configures the UE using the LTE positioning protocol (LPP) via AMF 132. The NG RAN 110 configures the UE 101 using radio resource control (RRC) protocol over LTE-Uu and NR-Uu interfaces.

In some aspects, the 5G system architecture 140B configures different reference signals to enable positioning measurements. Example reference signals that may be used for positioning measurements include the positioning reference signal (NR PRS) in the downlink and the sounding reference signal (SRS) for positioning in the uplink. The downlink positioning reference signal (PRS) is a reference signal configured to support downlink-based positioning methods.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF)

164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170B, e.g. an IMS operated by a different network operator.

In some aspects, the UDM/HSS 146 can be coupled to an application server 160B, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
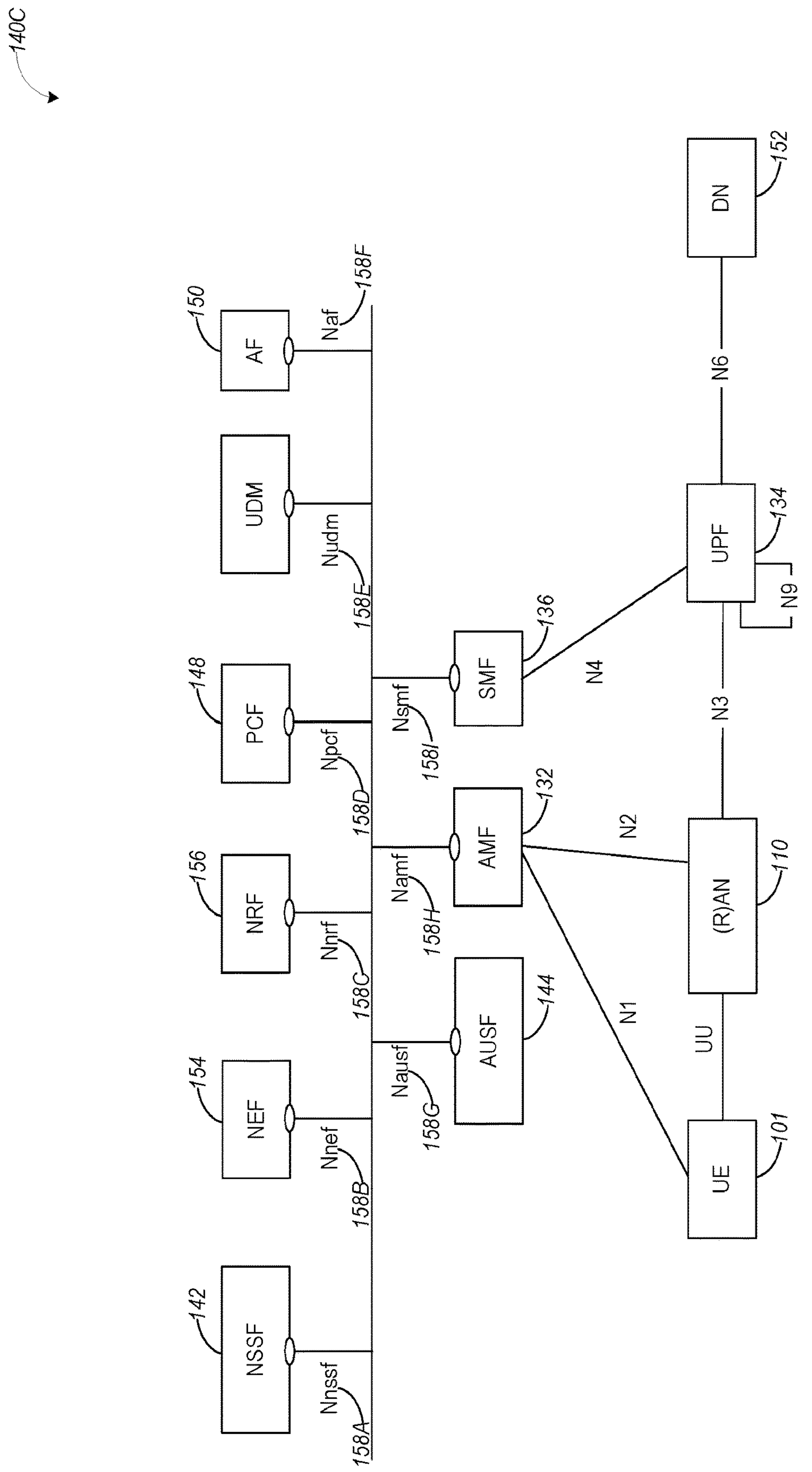

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

FIG. 2, FIG. 3, FIG. 4, FIG. 5, FIG. 6, and FIG. 7 illustrate various systems, devices, and components that may implement aspects of disclosed embodiments in different communication systems, such as 5G-NR networks including IAB networks. UEs, base stations (such as gNBs), and/or other nodes (e.g., any of the communication nodes in an IAB network) discussed in connection with FIGS. 1A-12 can be configured to perform the disclosed techniques.

Figure 2:
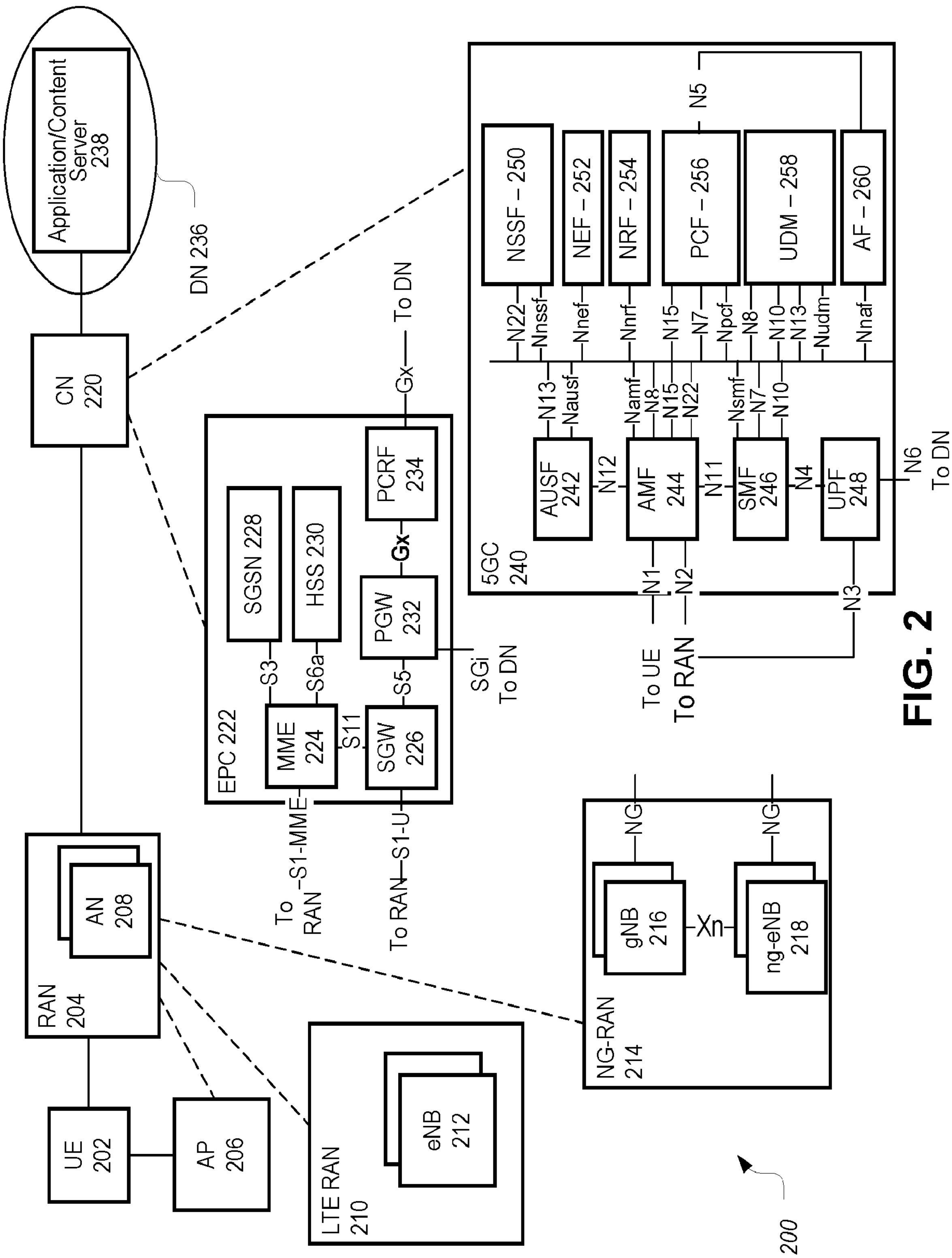
FIG. 2, FIG. 3, and FIG. 4 illustrate various systems, devices, and components that may implement aspects of disclosed embodiments.

FIG. 2 illustrates a network 200 in accordance with various embodiments. Network 200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 200 may include a UE 202, which may include any mobile or non-mobile computing device designed to communicate with a RAN 204 via an over-the-air connection. The UE 202 may be, but is not limited to, a smartphone, tablet computer, wearable computing device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, network 200 may include a plurality of UEs coupled directly with one another via a sidelink interface. The UEs may be M2M/D2D devices that communicate using physical sidelink channels such as but not limited to, PSBCH, PSDCH, PSSCH, PSCCH, PSFCH, etc.

In some embodiments, the UE 202 may additionally communicate with an AP 206 via an over-the-air connection. The AP 206 may manage a WLAN connection, which may serve to offload some/all network traffic from the RAN 204. The connection between the UE 202 and the AP 206 may be consistent with any IEEE 802.11 protocol, wherein the AP 206 could be a wireless fidelity (Wi-Fi®) router. In some embodiments, the UE 202, RAN 204, and AP 206 may utilize cellular-WLAN aggregation (for example, LWA/LWIP). Cellular-WLAN aggregation may involve the UE 202 being configured by the RAN 204 to utilize both cellular radio resources and WLAN resources.

The RAN 204 may include one or more access nodes, for example, access node (AN) 208. AN 208 may terminate air-interface protocols for the UE 202 by providing access stratum protocols including RRC, Packet Data Convergence Protocol (PDCP), Radio Link Control (RLC), MAC, and L1 protocols. In this manner, the AN 208 may enable data/voice connectivity between the core network (CN) 220 and the UE 202. In some embodiments, the AN 208 may be implemented in a discrete device or as one or more software entities running on server computers as part of, for example, a virtual network, which may be referred to as a CRAN or virtual baseband unit pool. The AN 208 be referred to as a BS, gNB, RAN node, eNB, ng-eNB, NodeB, RSU, TRxP, TRP, etc. The AN 208 may be a macrocell base station or a low-power base station for providing femtocells, picocells, or other like cells having smaller coverage areas, smaller user capacity, or higher bandwidth compared to macrocells.

In embodiments in which the RAN 204 includes a plurality of ANs, they may be coupled with one another via an X2 interface (if the RAN 204 is an LTE RAN) or an Xn interface (if the RAN 204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs of the RAN 204. For example, the UE 202 and RAN 204 may use carrier aggregation to allow the UE 202 to connect with a plurality of component carriers, each corresponding to a Pcell or Scell. In dual connectivity scenarios, a first AN may be a master node that provides an MCG and a second AN may be a secondary node that provides an SCG. The first/second ANs may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/Scells. Before accessing the unlicensed spectrum, the nodes may perform medium/carrier-sensing operations based on, for example, a listen-before-talk (LBT) protocol.

In V2X scenarios, the UE 202 or AN 208 may be or act as a roadside unit (RSU), which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high-speed events, such as crash avoidance, traffic warnings, and the like. Additionally, or alternatively, the RSU may provide other cellular/WLAN communications services. The components of the RSU may be packaged in a weatherproof enclosure suitable for outdoor installation and may include a network interface controller to provide a wired connection (e.g., Ethernet) to a traffic signal controller or a backhaul network.

In some embodiments, the RAN 204 may be an LTE RAN 210 with eNBs, for example, eNB 212. The LTE RAN 210 may provide an LTE air interface with the following characteristics: sub-carrier spacing (SCS) of 15 kHz; CP-OFDM waveform for downlink (DL) and SC-FDMA waveform for uplink (UL); turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operate on sub-6 GHz bands.

In some embodiments, the RAN 204 may be an NG-RAN 214 with gNBs, for example, gNB 216, or ng-eNBs, for example, ng-eNB 218. The gNB 216 may connect with 5G-enabled UEs using a 5G NR interface. The gNB 216 may connect with a 5G core through an NG interface, which may include an N2 interface or an N3 interface. The ng-eNB 218 may also connect with the 5G core through an NG interface but may connect with a UE via an LTE air interface. The gNB 216 and the ng-eNB 218 may connect over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN 214 and an AMF 244 (e.g., N2 interface).

The NG-RAN 214 may provide a 5G-NR air interface with the following characteristics: variable SCS; CP-OFDM for DL, CP-OFDM, and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS but may use PBCH DMRS for PBCH demodulation; PTRS for phase tracking for PDSCH and tracking reference signal for time tracking. The 5G-NR air interface may operate on FR1 bands that include sub-6 GHz bands or FR2 bands that include bands from 24.25 GHz to 52.6 GHz. The 5G-NR air interface may include a synchronization signal and physical broadcast channel (SS/PBCH) block (SSB) which is an area of a downlink resource grid that includes PSS/SSS/PBCH.

In some embodiments, the 5G-NR air interface may utilize BWPs (bandwidth parts) for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amounts of frequency resources (for example, PRBs) to support data transmission under different traffic loading scenarios. A BWP containing a smaller number of PRBs can be used for data transmission with a small traffic load while allowing power saving at the UE 202 and in some cases at the gNB 216. A BWP containing a larger number of PRBs can be used for scenarios with higher traffic loads.

The RAN 204 is communicatively coupled to CN 220 which includes network elements to provide various functions to support data and telecommunications services to customers/subscribers (for example, users of UE 202). The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

In some embodiments, the CN 220 may be connected to the LTE radio network as part of the Enhanced Packet System (EPS) 222, which may also be referred to as an EPC (or enhanced packet core). The EPC 222 may include MME 224, SGW 226, SGSN 228, HSS 230, PGW 232, and PCRF 234 coupled with one another over interfaces (or "reference points") as shown. Functions of the elements of the EPC 222 may be briefly introduced as follows.

The MME 224 may implement mobility management functions to track the current location of the UE 202 to facilitate paging, bearer activation/deactivation, handovers, gateway selection, authentication, etc.

The SGW 226 may terminate an S1 interface toward the RAN and route data packets between the RAN and the EPC 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 may track the location of the UE 202 and perform security functions and access control. In addition, the SGSN 228 may perform inter-EPC node signaling for mobility between different RAT networks; PDN and S-GW selection as specified by MME 224; MME selection for handovers; etc. The S3 reference point between the MME 224 and the SGSN 228 may enable user and bearer information exchange for inter-3GPP access network mobility in idle/active states.

The HSS 230 may include a database for network users, including subscription-related information to support the network entities' handling of communication sessions. The HSS 230 can provide support for routing/roaming, authentication, authorization, naming/addressing resolution, location dependencies, etc. An S6a reference point between the HSS 230 and the MME 224 may enable the transfer of subscription and authentication data for authenticating/authorizing user access to the LTE CN 220.

The PGW 232 may terminate an SGi interface toward a data network (DN) 236 that may include an application/content server 238. The PGW 232 may route data packets between the LTE CN 220 and the data network 236. The PGW 232 may be coupled with the SGW 226 by an S5 reference point to facilitate user plane tunneling and tunnel management. The PGW 232 may further include a node for policy enforcement and charging data collection (for example, PCEF). Additionally, the SGi reference point between the PGW 232 and the data network 236 may be an operator external public, a private PDN, or an intra-operator packet data network, for example, for the provision of IMS services. The PGW 232 may be coupled with a PCRF 234 via a Gx reference point.

The PCRF 234 is the policy and charging control element of the LTE CN 220. The PCRF 234 may be communicatively coupled to the app/content server 238 to determine appropriate QoS and charging parameters for service flows. The PCRF 234 may provision associated rules into a PCEF (via Gx reference point) with appropriate TFT and QCI.

In some embodiments, the CN 220 may be a 5GC 240. The 5GC 240 may include an AUSF 242, AMF 244, SMF 246, UPF 248, NSSF 250, NEF 252, NRF 254, PCF 256, UDM 258, and AF 260 coupled with one another over interfaces (or "reference points") as shown. Functions of the elements of the 5GC 240 may be briefly introduced as follows.

The AUSF 242 may store data for authentication of UE 202 and handle authentication-related functionality. The AUSF 242 may facilitate a common authentication framework for various access types. In addition to communicating with other elements of the 5GC 240 over reference points as shown, the AUSF 242 may exhibit a Nausf service-based interface.

The AMF 244 may allow other functions of the 5GC 240 to communicate with the UE 202 and the RAN 204 and to subscribe to notifications about mobility events with respect to the UE 202. The AMF 244 may be responsible for registration management (for example, for registering UE 202), connection management, reachability management, mobility management, lawful interception of AMF-related events, and access authentication and authorization. The AMF 244 may provide transport for SM messages between the UE 202 and the SMF 246, and act as a transparent proxy for routing SM messages. AMF 244 may also provide transport for SMS messages between UE 202 and an SMSF. AMF 244 may interact with the AUSF 242 and the UE 202 to perform various security anchor and context management functions. Furthermore, AMF 244 may be a termination point of a RAN CP interface, which may include or be an N2 reference point between the RAN 204 and the AMF 244; and the AMF 244 may be a termination point of NAS (N1) signaling, and perform NAS ciphering and integrity protection. AMF 244 may also support NAS signaling with the UE 202 over an N3 IWF interface.

The SMF 246 may be responsible for SM (for example, session establishment, tunnel management between UPF 248 and AN 208); UE IP address allocation and management (including optional authorization); selection and control of UP function; configuring traffic steering at UPF 248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 244 over N2 to AN 208; and determining SSC mode of a session. SM may refer to the management of a PDU session, and a PDU session or "session" may refer to a PDU connectivity service that provides or enables the exchange of PDUs between the UE 202 and the data network 236.

The UPF 248 may act as an anchor point for intra-RAT and inter-RAT mobility, an external PDU session point for interconnecting to data network 236, and a branching point to support multi-homed PDU sessions. The UPF 248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 248 may include an uplink classifier to support routing traffic flows to a data network.

The NSSF 250 may select a set of network slice instances serving the UE 202. The NSSF 250 may also determine the allowed NSSAI and the mapping to the subscribed S-NSSAIs if needed. The NSSF 250 may also determine the AMF set to be used to serve the UE 202, or a list of candidate AMFs based on a suitable configuration and possibly by querying the NRF 254. The selection of a set of network slice instances for the UE 202 may be triggered by the AMF 244 with which the UE 202 is registered by interacting with the NSSF 250, which may lead to a change of AMF. The NSSF 250 may interact with the AMF 244 via an N22 reference point; and may communicate with another NSSF in a visited network via an N31 reference point (not shown). Additionally, the NSSF 250 may exhibit an Nnssf service-based interface.

The NEF 252 may securely expose services and capabilities provided by 3GPP network functions for the third party, internal exposure/re-exposure, AFs (e.g., AF 260), edge computing or fog computing systems, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on the exposed capabilities of other NFs. This information may be stored at the NEF 252 as structured data, or a data storage NF using standardized interfaces. The stored information can then be re-exposed by the NEF 252 to other NFs and AFs, or used for other purposes such as analytics. Additionally, the NEF 252 may exhibit a Nnef service-based interface.

The NRF 254 may support service discovery functions, receive NF discovery requests from NF instances, and provide the information of the discovered NF instances to the NF instances. NRF 254 also maintains information on available NF instances and their supported services. As used herein, the terms "instantiate," "instantiation," and the like may refer to the creation of an instance, and an "instance" may refer to a concrete occurrence of an object, which may occur, for example, during the execution of program code. Additionally, the NRF 254 may exhibit the Nnrf service-based interface.

The PCF 256 may provide policy rules to control plane functions to enforce them, and may also support a unified policy framework to govern network behavior. The PCF 256 may also implement a front end to access subscription information relevant to policy decisions in a UDR of the UDM 258. In addition to communicating with functions over reference points as shown, the PCF 256 exhibits an Npcf service-based interface.

The UDM 258 may handle subscription-related information to support the network entities' handling of communication sessions and may store the subscription data of UE 202. For example, subscription data may be communicated via an N8 reference point between the UDM 258 and the AMF 244. The UDM 258 may include two parts, an application front end, and a user data repository (UDR) (not illustrated in FIG. 2). The UDR may store subscription data and policy data for the UDM 258 and the PCF 256, and/or structured data for exposure and application data (including PFDs for application detection, application request information for multiple UEs 202) for the NEF 252. A Nudr service-based interface may be exhibited by the UDR to allow the UDM 258, PCF 256, and NEF 252 to access a particular set of stored data, as well as to read, update (e.g., add, modify), delete, and subscribe to the notification of relevant data changes in the UDR. The UDM may include a UDM-FE, which is in charge of processing credentials, location management, subscription management, and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

The AF 260 may provide application influence on traffic routing, provide access to NEF, and interact with the policy framework for policy control.

In some embodiments, the 5GC 240 may enable edge computing by selecting operator/3rd party services to be geographically close to a point that the UE 202 is attached to the network. This may reduce latency and load on the network. To provide edge-computing implementations, the 5GC 240 may select a UPF 248 close to the UE 202 and execute traffic steering from the UPF 248 to data network 236 via the N6 interface. This may be based on the UE subscription data, UE location, and information provided by the AF 260. In this way, the AF 260 may influence UPF (re) selection and traffic routing. Based on operator deployment, when AF 260 is considered to be a trusted entity, the network operator may permit AF 260 to interact directly with relevant NFs. Additionally, the AF 260 may exhibit a Naf service-based interface.

The data network 236 may represent various network operator services, Internet access, or third-party services that may be provided by one or more servers including, for example, application/content server 238.

Figure 3:
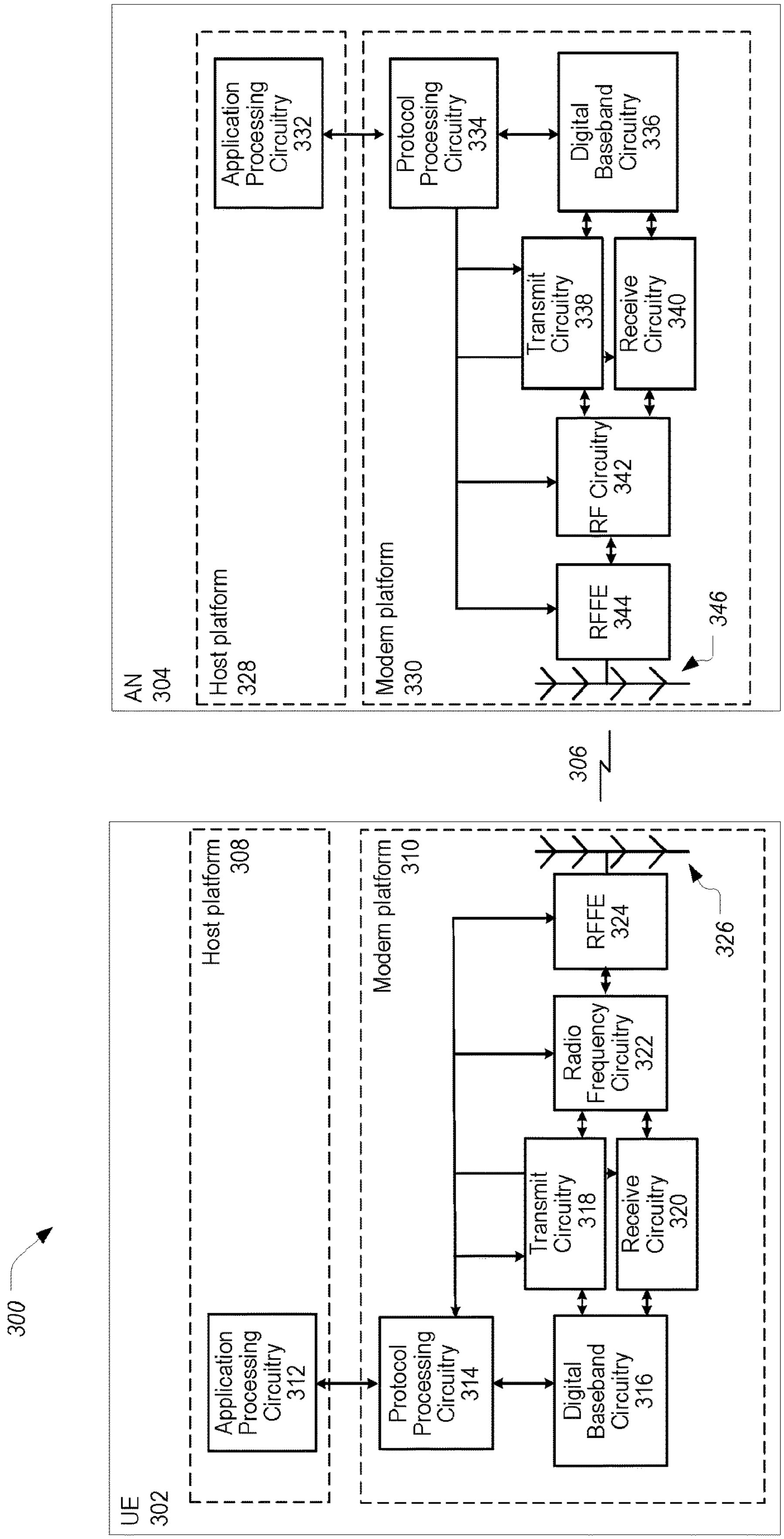

FIG. 3 schematically illustrates a wireless network 300 in accordance with various embodiments. The wireless network 300 may include a UE 302 in wireless communication with AN 304. The UE 302 and AN 304 may be similar to, and substantially interchangeable with, like-named components described elsewhere herein.

The UE 302 may be communicatively coupled with the AN 304 via connection 306. The connection 306 is illustrated as an air interface to enable communicative coupling and can be consistent with cellular communications protocols such as an LTE protocol or a 5G NR protocol operating at mmWave or sub-6 GHz frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example, IP) operations The protocol processing circuitry 314 may implement one or more layer operations to facilitate transmission or reception of data over connection 306. The layer operations implemented by the protocol processing circuitry 314 may include, for example, MAC, RLC, PDCP, RRC, and NAS operations.

The modem platform 310 may further include digital baseband circuitry 316 that may implement one or more layer operations that are "below" layer operations performed by the protocol processing circuitry 314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318, receive circuitry 320, RF circuitry 322, RFFE 324, and antenna panels 326 (referred to generically as "transmit/receive components") may be specific to details of a specific implementation such as, for example, whether the communication is TDM or FDM, in mmWave or sub-6 GHz frequencies, etc. In some embodiments, the transmit/receive components may be arranged in multiple parallel transmit/receive chains, may be disposed of in the same or different chips/modules, etc.

In some embodiments, the protocol processing circuitry 314 may include one or more instances of control circuitry (not shown) to provide control functions for the transmit/receive components.

A UE reception may be established by and via the antenna panels 326, RFFE 324, RF circuitry 322, receive circuitry 320, digital baseband circuitry 316, and protocol processing circuitry 314. In some embodiments, the antenna panels 326 may receive a transmission from the AN 304 by receive-beamforming signals received by a plurality of antennas/antenna elements of the one or more antenna panels 326.

A UE transmission may be established by and via the protocol processing circuitry 314, digital baseband circuitry 316, transmit circuitry 318, RF circuitry 322, RFFE 324, and antenna panels 326. In some embodiments, the transmit components of the UE 302 may apply a spatial filter to the data to be transmitted to form a transmit beam emitted by the antenna elements of the antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and substantially interchangeable with the like-named components of the UE 302. In addition to performing data transmission/reception as described above, the components of the AN 304 may perform various logical functions that include, for example, RNC functions such as radio bearer management, uplink and downlink dynamic radio resource management, and data packet scheduling.

Figure 4:
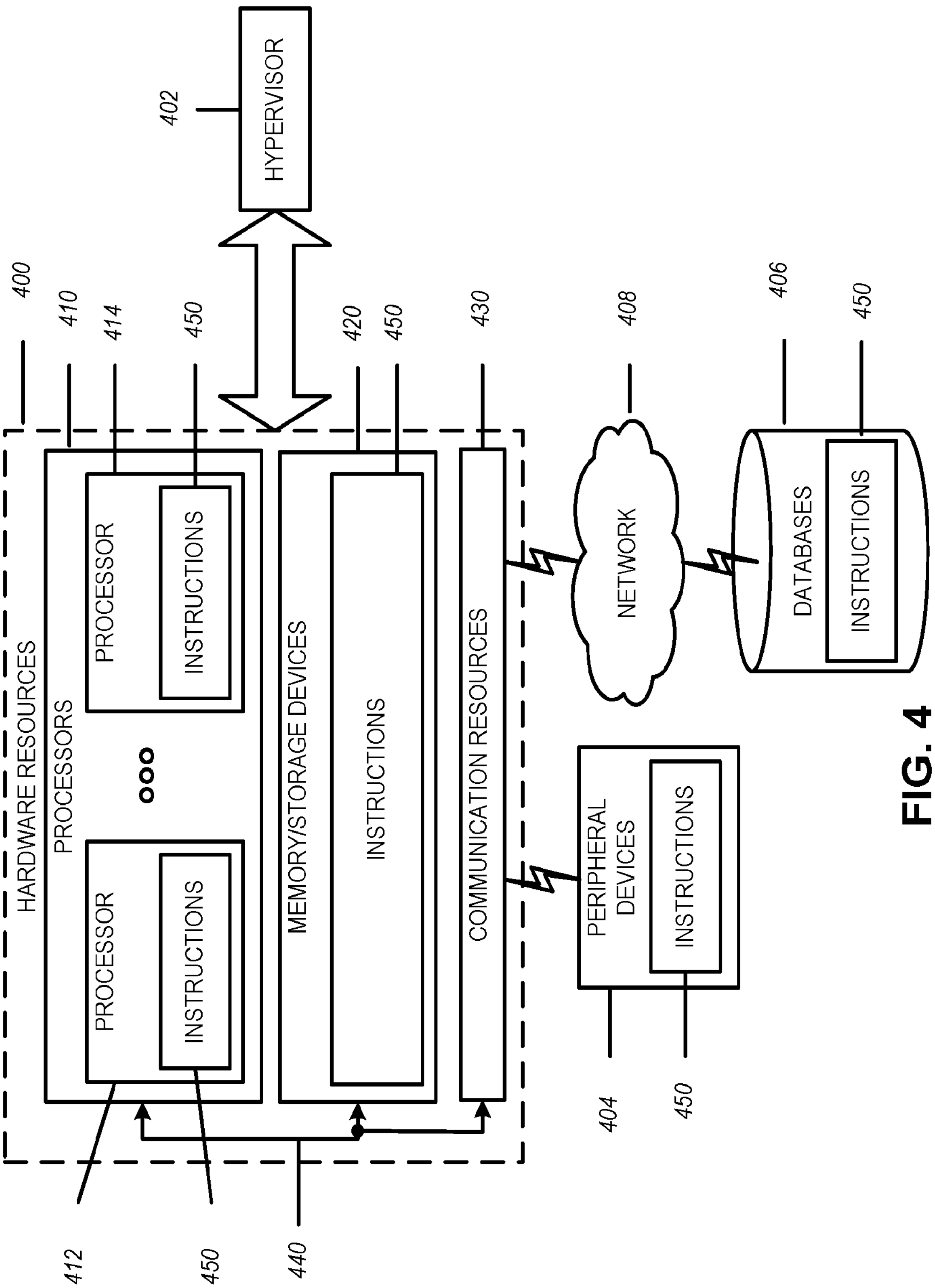

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440 or other interface circuitry. For embodiments where node virtualization (e.g., NFV) is utilized, a hypervisor 402 may be executed to provide an execution environment for one or more network slices/sub-slices to utilize the hardware resources 400.

The processors 410 may include, for example, a processor 412 and a processor 414. The processors 410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 420 may include a main memory, disk storage, or any suitable combination thereof. The memory/storage devices 420 may include but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 430 may include interconnection or network interface controllers, components, or other suitable devices to communicate with one or more peripheral devices 404 or one or more databases 406 or other network elements via a network 408. For example, the communication resources 430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

For one or more embodiments, at least one of the components outlined in one or more of the preceding figures may be configured to perform one or more operations, techniques, processes, and/or methods as outlined in the example sections below. For example, baseband circuitry associated with one or more of the preceding figures may be configured to operate in accordance with one or more of the examples set forth below. For another example, circuitry associated with a UE, base station, satellite, network element, etc. as described above in connection with one or more of the preceding figures may be configured to operate in accordance with one or more of the examples set forth below in the example section.

The term "application" may refer to a complete and deployable package, or environment to achieve a certain function in an operational environment. The term "AI/ML application" or the like may be an application that contains some artificial intelligence (AI)/machine learning (ML) models and application-level descriptions. In some embodiments, an AI/ML application may be used for configuring or implementing one or more of the disclosed aspects.

The term "machine learning" or "ML" refers to the use of computer systems implementing algorithms and/or statistical models to perform a specific task(s) without using explicit instructions but instead relying on patterns and inferences. ML algorithms build or estimate mathematical model(s) (referred to as "ML models" or the like) based on sample data (referred to as "training data," "model training information," or the like) to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principal component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific to an ML-assisted solution; an ML pipeline may include one or several data sources in a data pipeline, a model training pipeline, a model evaluation pipeline, and an actor. The "actor" is an entity that hosts an ML-assisted solution using the output of the ML model inference). The term "ML training host" refers to an entity, such as a network function, that hosts the training of the model. The term "ML inference host" refers to an entity, such as a network function, that hosts the model during inference mode (which includes both the model execution as well as any online learning if applicable). The ML-host informs the actor about the output of the ML algorithm, and the actor decides on an action (an "action" is performed by an actor as a result of the output of an ML-assisted solution). The term "model inference information" refers to information used as an input to the ML model for determining inference(s); the data used to train an ML model and the data used to determine inferences may overlap, however, "training data" and "inference data" refer to different concepts.

In some aspects, DCI format 2_5 is reused to support soft resource availability indications for IAB-DU frequency-domain resources. The disclosed techniques include possible enhancements on DCI format 2_5 to support frequency-domain soft resource availability indications. Since dynamic soft availability indication in frequency-domain is based on semi-static IAB-DU soft resource configuration, the disclosure will initially describe frequency-domain semi-static resource configurations for an IAB-DU.

Figure 5:
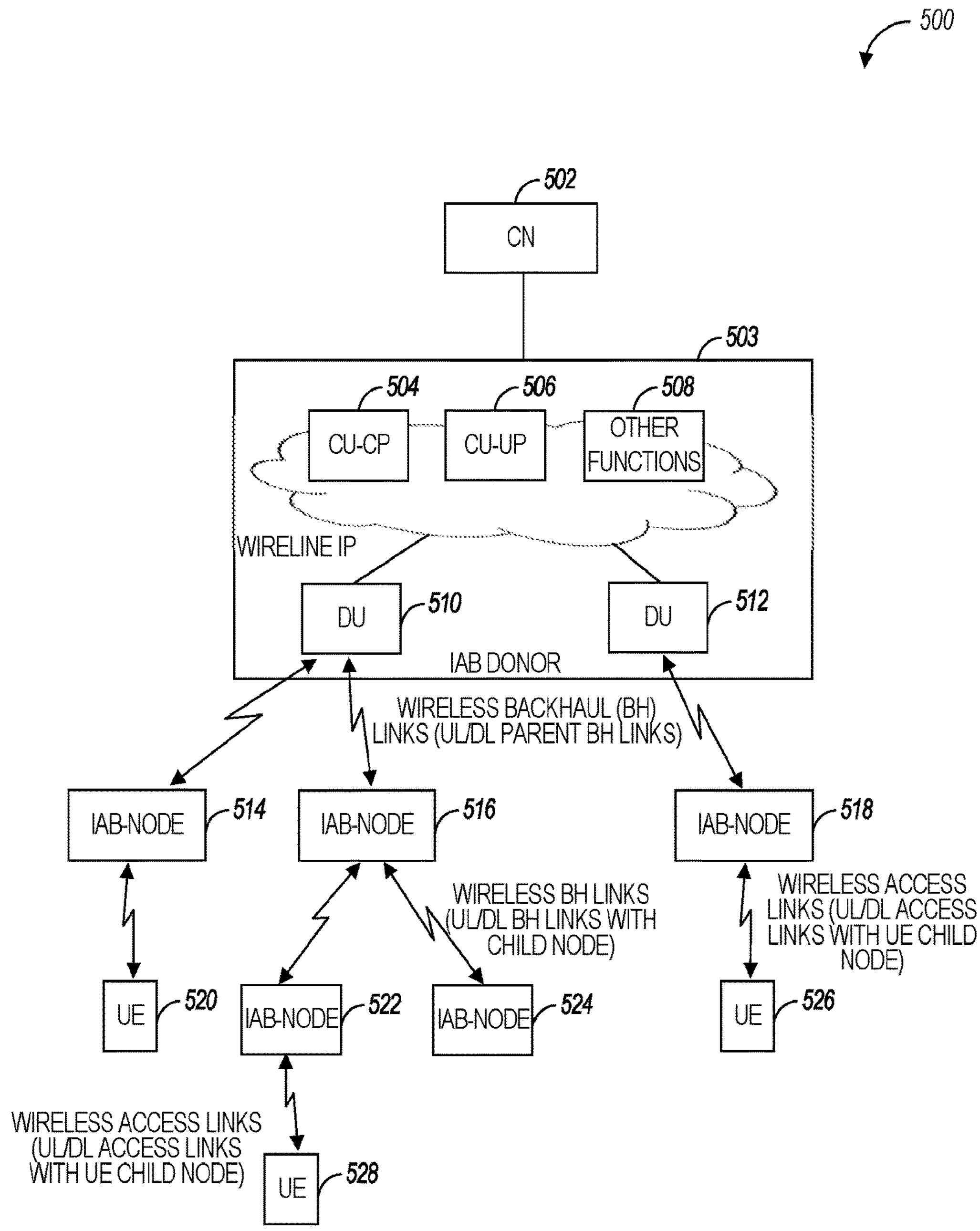
FIG. 5 illustrates a reference diagram of an IAB architecture, in accordance with some aspects.
Figure 6:
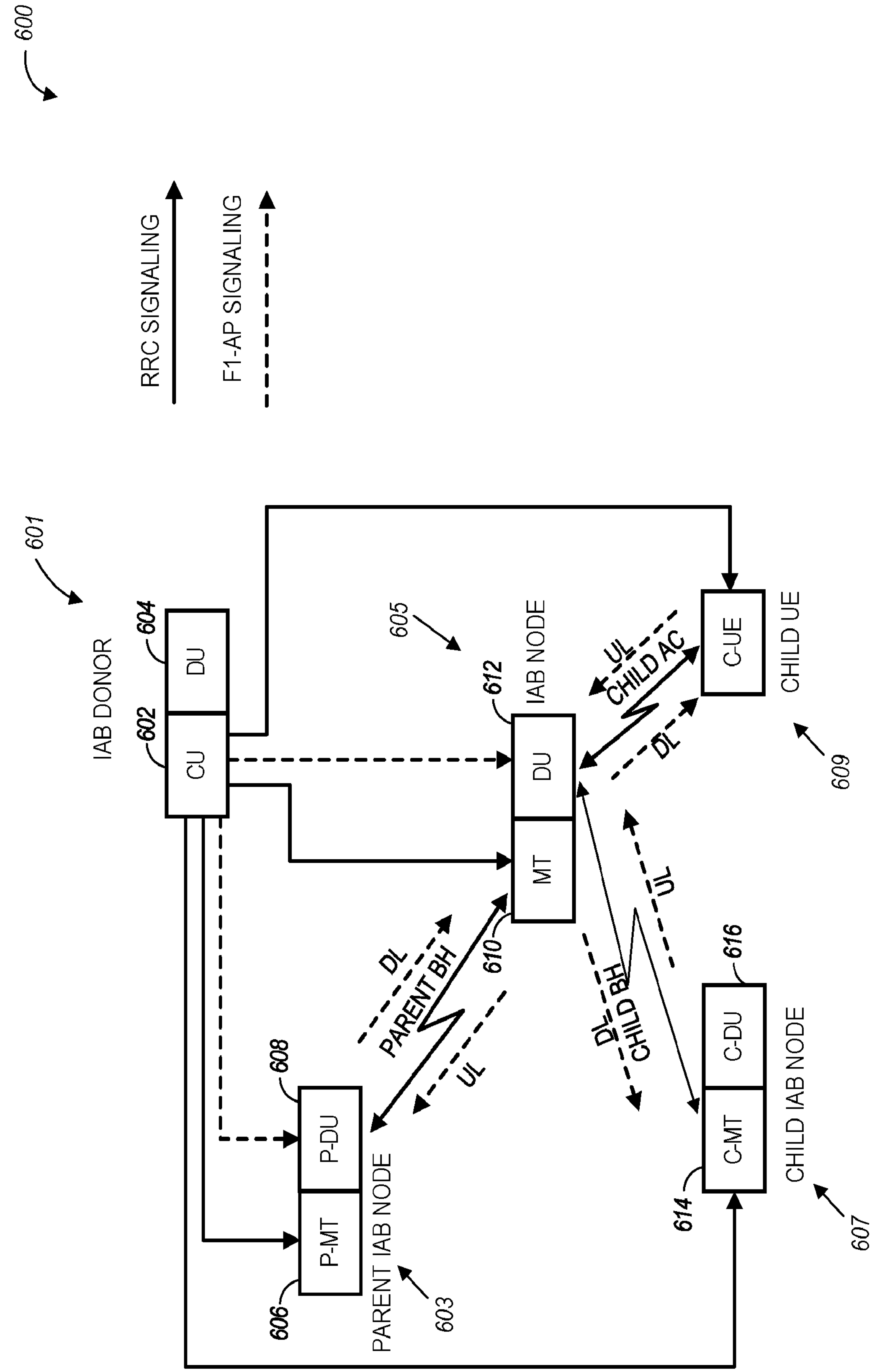
FIG. 6 illustrates a central unit (CU)—distributed unit (DU) split and signaling in an IAB architecture, in accordance with some aspects.

As illustrated in FIGS. 5-6, in an IAB network, an IAB node can connect to its parent node (an IAB donor or another IAB node) through a parent backhaul (BH) link, connect to a child user equipment (UE) through a child access (AC) link, and connect to a child IAB node through a child BH link.

FIG. 5 shows a reference diagram for IAB in a standalone mode, which contains one IAB donor node 503 and multiple IAB nodes (e.g., 514, 516, 518, 522, and 524). Referring to FIG. 5, the IAB architecture 500 can include a core network (CN) 502 coupled to an IAB donor node 503. The IAB donor node 503 can include control unit control plane (CU-CP) function 504, control unit user plane (CU-UP) function 506, other functions 508, and distributed unit (DU) functions 510 and 512. The DU function 510 can be coupled via wireless backhaul links to IAB nodes 514 and 516. The DU function 512 is coupled via a wireless backhaul link to IAB node 518. IAB node 514 is coupled to a UE 520 via a wireless access link, and IAB node 516 is coupled to IAB nodes 522 and 524. The IAB node 522 is coupled to UE 528 via a wireless access link. The IAB node 518 is coupled to UE 526 via a wireless access link.

Each of the IAB nodes illustrated in FIG. 5 can include a mobile termination (MT) function and a DU function. The MT function can be defined as a component of the mobile equipment and can be referred to as a function residing on an IAB node that terminates the radio interface layers of the backhaul Uu interface toward the IAB donor or other IAB nodes.

The IAB donor 503 is treated as a single logical node that comprises a set of functions such as a gNB-DU function, a gNB-CU-CP function 504, a gNB-CU-UP function 506, and potentially other functions 508. In deployment, the IAB donor 503 can be split according to these functions, which can all be either collocated or non-collocated as allowed by 3GPP NG-RAN architecture. IAB-related aspects may arise when such a split is exercised. In some aspects, some of the functions presently associated with the IAB donor may eventually be moved outside of the donor in case it becomes evident that they do not perform IAB-specific tasks.

FIG. 6 illustrates a central unit (CU)-distributed unit (DU) split and signaling in an IAB architecture 600, in accordance with some aspects. Referring to FIG. 6, the IAB architecture 600 includes an IAB donor 601, a parent IAB node 603, an IAB node 605, a child IAB node 607, and a child UE 609. The IAB donor 601 includes a CU function 602 and a DU function 604. The parent IAB node 603 includes a parent MT (P-MT) function 606 and a parent DU (P-DU) function 608. The IAB node 605 includes an MT function 610 and a DU function 612. The child IAB node 607 includes a child MT (C-MT) function 614 and a child DU (C-DU) function 616.

As illustrated in FIG. 6, RRC signaling can be used for communication between the CU function 602 of the IAB donor 601 and the MT functions 606, 610, and 614, as well as between the CU function 602 and the child UE (C-UE) 609. Additionally, F1 access protocol (F1AP) signaling can be used for communication between the CU function 602 of the IAB donor 601 and the DU functions of the parent IAB node 603 and the IAB node 605.

As illustrated in FIGS. 5-6, multiple IAB nodes are connected to a donor node (DN) via a wireless backhaul. A DN or a parent IAB node needs to properly allocate resources for its child IAB node under the half-duplex constraint at the child IAB node. In some aspects, the time-frequency resource allocated to the parent link may be orthogonal to the time-frequency resource allocated to the child or access link.

In an example IAB network architecture (e.g., as illustrated in FIG. 5 and FIG. 6), CU/DU split has been leveraged where each IAB node holds a DU and an MT function. Via the MT function, the IAB node connects to its parent IAB node or the IAB-donor like a UE. Via the DU function, the IAB node communicates with its child UEs and child MTs like a base station. In some aspects, RRC signaling is used between the CU in the IAB donor and the UE/MT, while F1AP signaling is used between the CU and the DU in an IAB node.

FIG. 6 illustrates an example of the IAB CU/DU split architecture and signaling, where MT and DU in a parent IAB node are indicated as P-MT/P-DU, and MT and DU in a child IAB node are indicated as C-MT/C-DU, and a child UE is indicated as C-UE.

In some embodiments, a TDM-based DU function and an MT function may be supported within an IAB node. Extended IAB functionalities include duplexing enhancements to increase spectral efficiency and reduce latency through the support of SDM/FDM-based resource management, simultaneous transmissions, and/or reception on IAB nodes.

Figure 7:
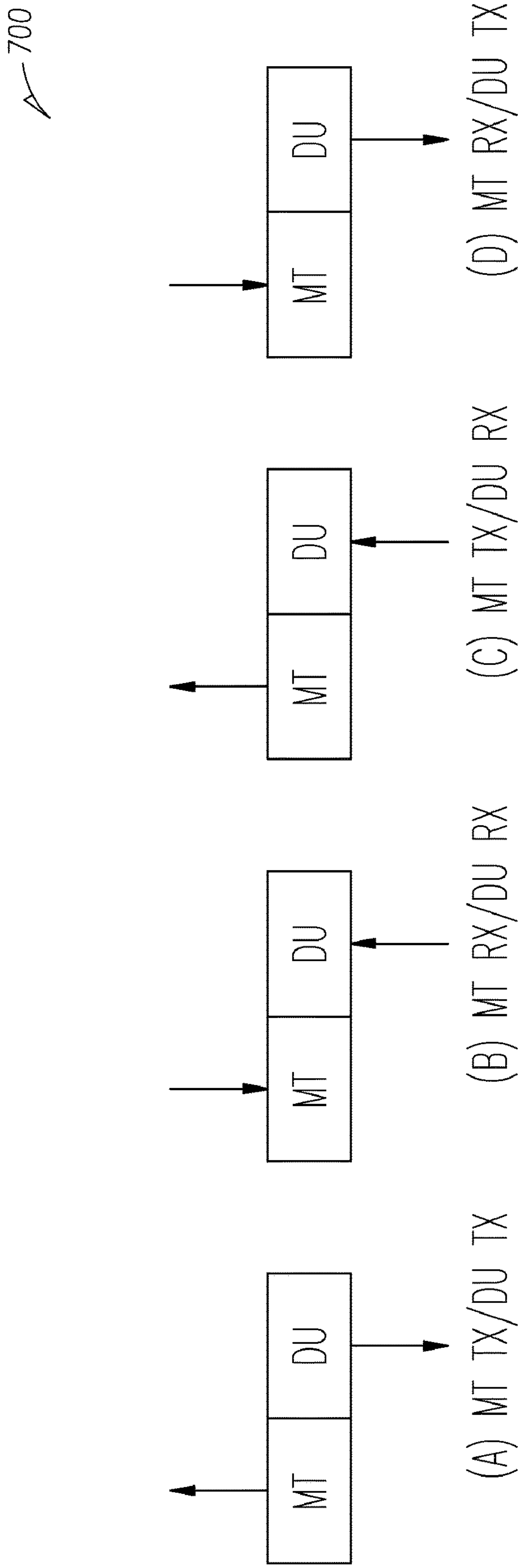
FIG. 7 illustrates IAB MT/DU simultaneous transmission or reception communication scenarios, in accordance with some aspects.

FIG. 7 illustrates IAB MT/DU simultaneous transmission or reception communication scenarios 700, in accordance with some aspects. In some embodiments, simultaneous operation (transmission and/or reception) of IAB-node's child and parent links includes four cases as below (illustrated in FIG. 7):

(a) MT TX/DU TX;

(b) MT RX/DU RX;

(c) MT TX/DU RX; and (d) MT RX/DU TX.

In some embodiments, if IAB MT/DU simultaneous transmission is allowed, there will be additional power control demands other than UL power control. For example, in FIG. 7 case (b), an IAB MT function is received from its parent DU and the co-located DU is received from its child. Since DL transmission usually has higher equivalent isotropic radiated power (EIRP) than UL transmission, there will be a high chance that MT received power will be much higher than the co-located DU received power (un-balanced receiving power), which will cause high interference. Since UL transmission power is limited by the UE/MT capability, UL power control in the current specification may not fully solve this issue. Hence, DL power control (MT informs its parent DU to adjust its DL transmission power) is needed for the IAB backhaul.

In some aspects, MT/DU simultaneous operations at an IAB node can be fulfilled either with space-division multiplexing (SDM) or with frequency-division multiplexing (FDM). In SDM, the parent link and the child link are separated in the spatial domain and these links do not have to be separated in the frequency domain. In FDM, the parent link and the child link can be separated in the frequency domain.

In some aspects associated with FDM, to facilitate an IAB-MT and co-located IAB-DU to operate at the same component carrier (CC), hard, soft, not available (H/S/NA) resource types can be assigned to IAB DU frequency-domain resources through semi-static configuration (e.g., via communication from a CU function of an IAB donor node to a DU function of an IAB node using F1AP signaling). After that, the availability indication of IAB-DU's soft frequency-domain resources can be dynamically transmitted.

In some aspects, DCI format 2_5 (e.g., communicated from the P-DU function of the parent IAB node to the MT function of the IAB node) is reused to support soft resource availability indications for IAB-DU frequency-domain resource. The disclosed techniques include enhancements on DCI format 2_5 to support frequency-domain soft resource availability indications. Since dynamic soft availability indication in frequency-domain is based on semi-static IAB-DU soft resource configuration, the disclosed techniques can provide frequency-domain semi-static resource configurations for an IAB-DU.

In some aspects, an IAB-DU can be provided with both time-domain H/S/NA and frequency-domain H/S/NA configurations. However, for a given resource, either time-domain H/S/NA or frequency-domain H/S/NA can be applied.

In some aspects, there can be different scenarios for semi-static frequency-domain H/S/NA configuration, based on D/U/F is defined in time-domain or frequency-domain (these two scenarios are discussed below).

Semi-Static Configuration Scenario 1: Frequency-Domain H/S/NA Application With Time-Domain Resource Types (e.g., Downlink//Uplink/Flexible, or D/U/F)

In this scenario, an IAB-DU frequency-domain H/S/NA configuration is based on Rel-16 time-domain D/U/F configuration, i.e., Rel-16 time-domain D/U/F configuration remains no matter time-domain H/S/NA or frequency-domain H/S/NA application. As Rel-16 time-domain D/U/F configuration is for the whole IAB-DU bandwidth, frequency-domain H/S/NA will divide DU's bandwidth into hard regions/soft regions/not available regions, with each region composing of a set of N RBs (also referred to as one resource block set) (N can be 4, 8, 16 or larger).

In some aspects, each frequency-domain H/S/NA application can be per-slot level or per-resource type level.

Figure 8:
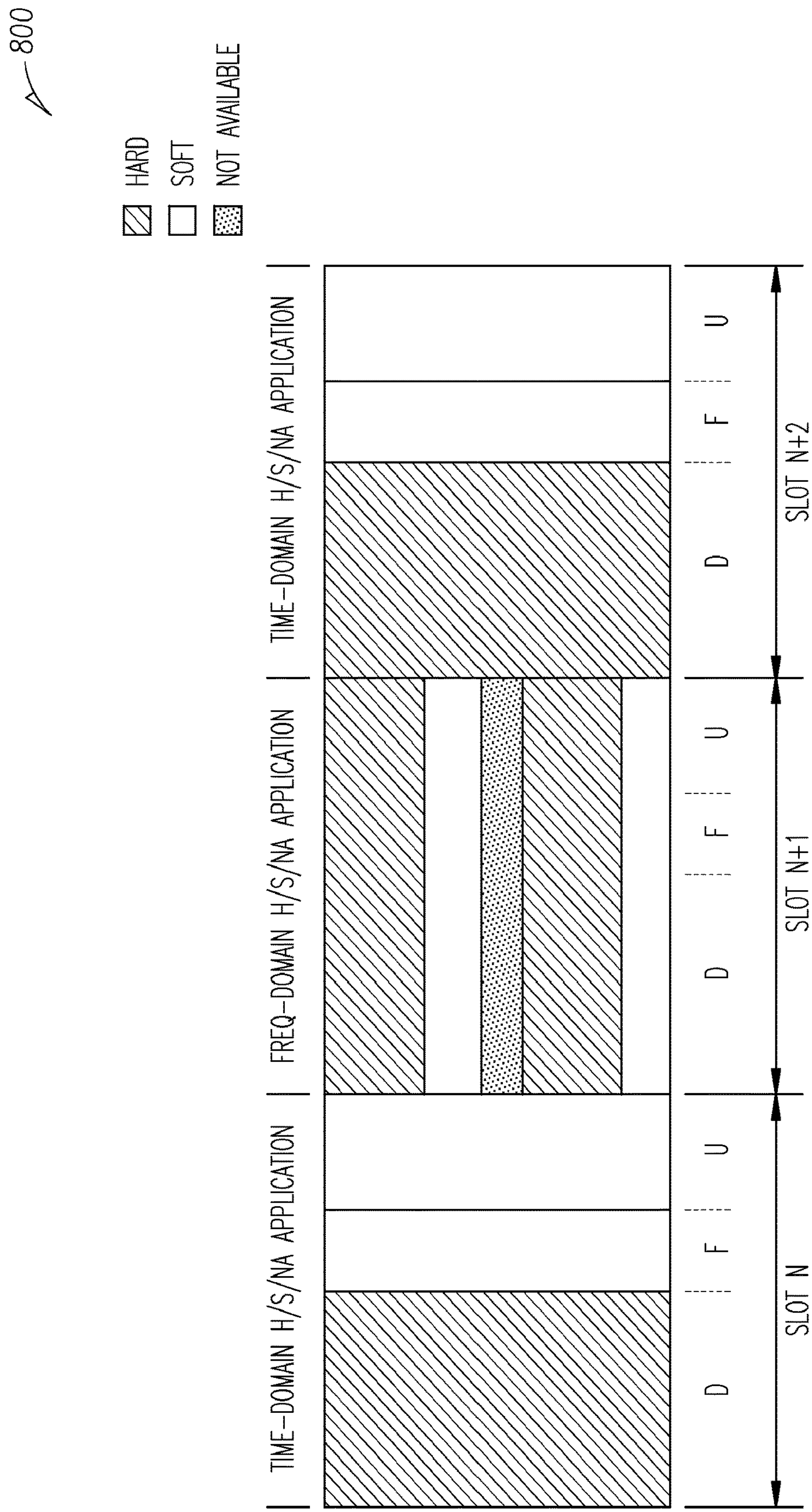
FIG. 8 illustrates per-slot level frequency-domain H/S/NA application in a scenario 1 resource configuration, in accordance with some aspects.

FIG. 8 illustrates diagram 800 of per-slot level frequency-domain H/S/NA application in a scenario 1 resource configuration, in accordance with some aspects.

In FIG. 8, a per-slot level frequency-domain H/S/NA application is illustrated. Slot n/Slot n+1/Slot n+2 have the same D/F/U configuration in the time domain, and Slot n and Slot n+2 have Rel-16 NR IAB time-domain H/S/NA application. Slot n+1 remains the time-domain D/F/U configuration and applies frequency-domain H/S/NA in the whole slot. In the illustrated example, two hard regions, two soft regions, and one NA region are included.

Figure 9:
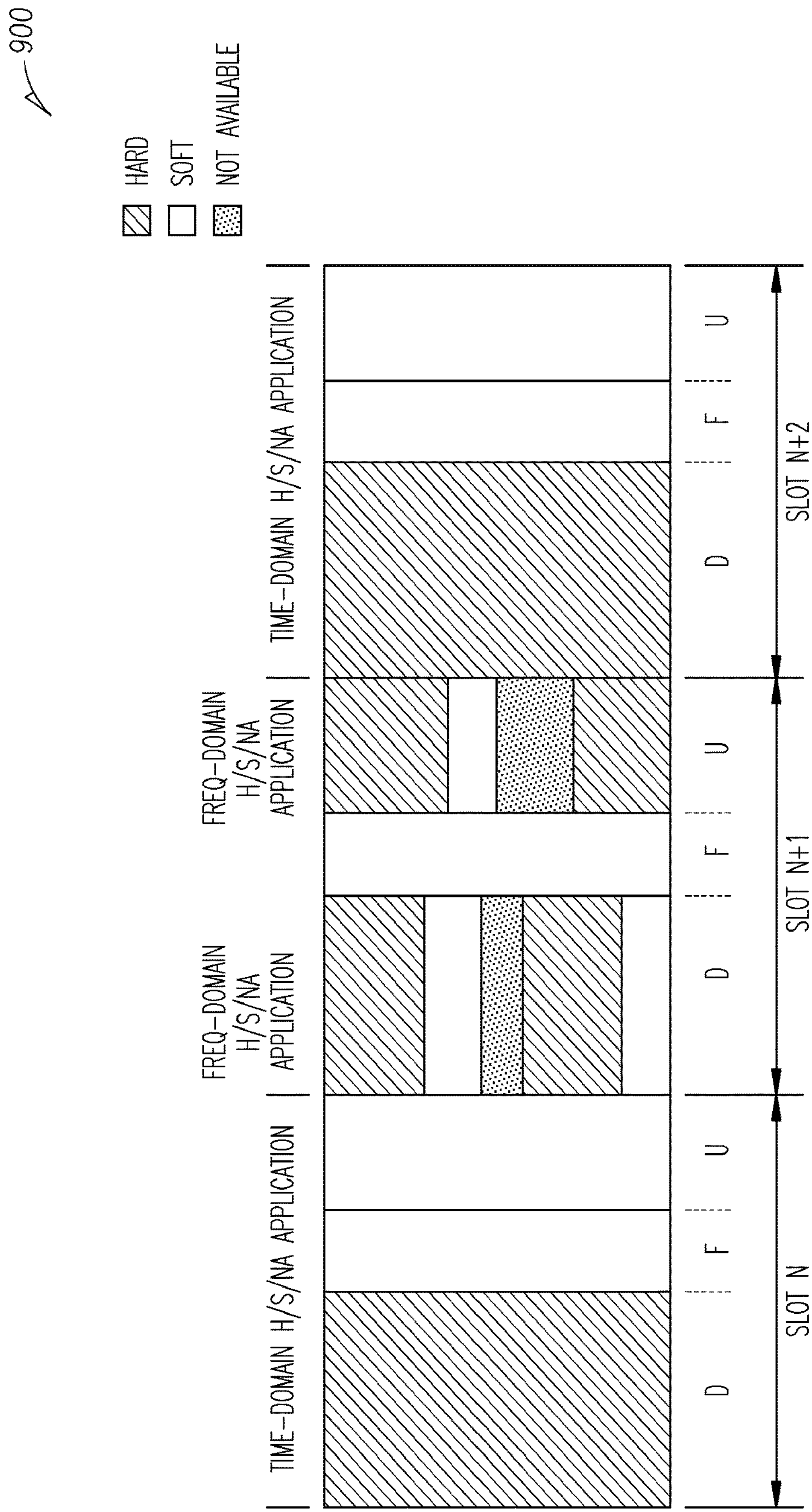
FIG. 9 illustrates per-resource type level frequency-domain H/S/NA application in a scenario 1 resource configuration, in accordance with some aspects.

FIG. 9 illustrates a diagram 900 of per-resource type level frequency-domain H/S/NA application in a scenario 1 resource configuration, in accordance with some aspects.

In FIG. 9, a per-resource type level frequency-domain H/S/NA application is illustrated. Slot n/Slot n+1/Slot n+2 also have the same D/F/U configuration in the time domain, and Slot n and Slot n+2 have Rel-16 NR IAB time-domain H/S/NA application. Slot n+1 remains the time-domain D/F/U configuration and applies frequency-domain H/S/NA for each resource type (D/U/F). In this example, for resource type D (downlink), it has two hard regions, two soft regions, and one NA region; for resource type F (flexible), it has one soft region; for resource type U (uplink), it has two hard regions, one soft region, and one NA region.

In some aspects, semi-static H/S/NA configuration scenario 1 in the IAB-DU frequency domain can be fulfilled by F1AP signaling. In some aspects, the following several options can be used to enhance the F1AP signaling for H/S/NA configuration scenario 1:

(a) Option 1: Enhancement of the existing GNB-DU RESOURCE CONFIGURATION message.

(b) Option 2: Enhancement of the existing gNB-DU Cell Resource Configuration IE.

(c) Option 3: Introduction of a new dedicated F1AP message/IE.

An example embodiment of per-slot level frequency-domain H/S/NA configuration is shown in Table 1 below, which can be included in F1AP signaling based on H/S/NA regions (each region is composed of at least one RB set (RBS)).

TABLE 1

| IE/Group Name | Presence | Range | IE type and reference | Semantics description |
|---|---|---|---|---|
| H/S/NA freq-domain Slot Configuration List | | 0 . . . 1 | | |
| >HSNA freq-domain Slot Configuration Item | | 1 . . . <maxnoofHSNASlots> | | |
| >>N | O | | ENUMERATED (4, 8, 16, 32, 64) | Frequency-domain resource allocation granularity of RB set (RBS). One RBS includes N RBs. |
| >>slotIndex | O | | INTEGER (0 . . . maxNrofSlots-1) | The slot number of this H/S/NA configuration |
| >>HSNA freq-domain regions | | 1 . . . <maxnoofRegionsPerCC | | |
| >>>regionIndex | O | 1 . . . <maxnoofregionIndex> | | H/S/NA region index |
| >>>regionSize | O | 1 . . . <maxnoofRBSPerRegion> | | The number of RBS included in this region |
| >>>HSNA-attribute | O | | ENUMERATED (HARD, SOFT, NOTAVAILABLE) | HSNA value for this freq-domain region |

Semi-Static Configuration Scenario 2: Frequency-Domain H/S/NA With Frequency-Domain D/U/F In this scenario, the D/U/F resource type is configured in the frequency domain and with a granularity of a set of N RBs (N can be 4, 8, 16, or larger). It can have a D/F/U pattern or a U/F/D pattern as follows:

(a) D/F/U pattern: start with "downlink" resource type (if any), followed by "flexible" resource type, and end with "uplink" resource type (if any); and (b) U/F/D pattern: start with "uplink" resource type (if any), followed by "flexible" resource type, and end with "downlink" resource type (if any).

In some aspects, frequency-domain H/S/NA attributes are provided per-resource type, i.e., each resource type only has one attribute, either hard, soft, or not available.

Figure 10:
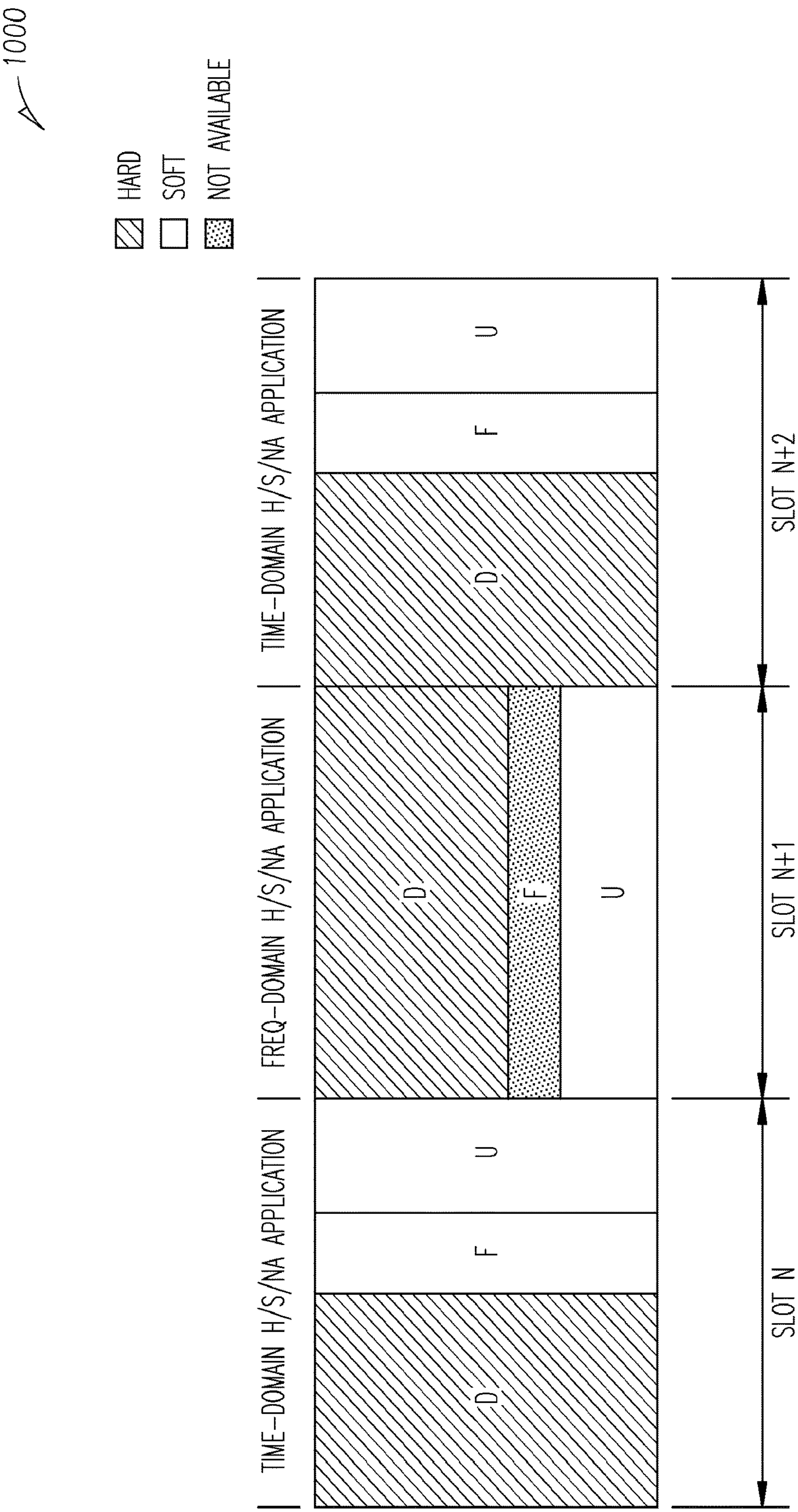
FIG. 10 illustrates a scenario 2 resource configuration, in accordance with some aspects.

FIG. 10 illustrates diagram 1000 of a scenario 2 resource configuration, in accordance with some aspects.

In FIG. 10, frequency-domain H/S/NA application with frequency-domain D/U/F configuration is illustrated. Slot n/Slot n+2 have time-domain D/F/U configuration and time-domain H/S/NA attributes. Slot n+1 has frequency-domain D/F/U configuration and frequency-domain H/S/NA attributes, with "D" resource type assigned with "Hard" attribute, "F" resource type assigned with "Not Available" attribute, and "U" resource type assigned with "Soft" attribute.

In some aspects, in Scenario 2, the IAB-node is working in full-duplex mode since DL/UL will transmit at the same time.

In some embodiments, semi-static H/S/NA configuration scenario 2 in the IAB-DU frequency domain can be fulfilled by F1AP signaling. There can be several options to enhance the F1AP signaling for H/S/NA configuration scenario 1, as follows:

(a) Option 1: Enhancement of the existing GNB-DU RESOURCE CONFIGURATION message.

(b) Option 2: Enhancement of the existing gNB-DU Cell Resource Configuration IE.

(c) Option 3: Introduction of a new dedicated FLAP message/IE.

One embodiment of frequency-domain H/S/NA configuration scenario 2 is shown in Table 2 below, which can be included in F1AP signaling based on D/U/F regions (e.g., each region is composed of at least one RB set (RBS)).

TABLE 2

| IE/Group Name | Presence | Range | IE type and reference | Semantics description |
|---|---|---|---|---|
| D/U/F freq-domain Slot Configuration List | | 0 . . . 1 | | |

TABLE 2-continued

| IE/Group Name | Presence | Range | IE type and reference | Semantics description |
|---|---|---|---|---|
| >D/U/F freq-domain Slot Configuration Item | | 1 . . . <maxnoofDUFSlots> | | |
| >>N | M | | ENUMERATED (4, 8, 16, 32, 64) | Frequency-domain resource allocation granularity of RB set (RBS). One RBS includes N RBs. |
| >>slotIndex | O | | INTEGER (0 . . . maxNrofSlots-1) | The slot number of this D/U/F configuration |
| >>Permutation | M | | ENUMERATED (DFU, UFD, . . . ) | The pattern of freq-domain resource |
| >>DUF freq-domain regions | | 1 . . . <maxnoofRegionsPerCC | | |
| >>>regionSize | O | 1 . . . <maxnoofRBSPerRegion> | | The number of RBS included in this region |
| >>>Number of downlink RBS | O | | INTEGER (0 . . . maxNrofRBSPerRegion) | The number of downlink RBS in this region |
| >>>Number of uplink RBS | O | | INTEGER (0 . . . maxNrofRBSPerRegion) | The number of uplink RBS in this region |
| >>>Number of downlink RBS | O | | INTEGER (0 . . . maxNrofRBSPerRegion) | The number of downlink RBS in this region |
| >>>downlink-HSNA-attribute | O | | ENUMERATED (HARD, SOFT, NOTAVAILABLE, . . . ) | HSNA attribute for downlink freq-domain resource |
| >>>flexible-HSNA-attribute | O | | ENUMERATED (HARD, SOFT, NOTAVAILABLE, . . . ) | HSNA attribute for flexible freq-domain resource |
| >>>uplink-HSNA-attribute | | | NUMERATED (HARD, SOFT, NOTAVAILABLE, . . . ) | SNA attribute for uplink freq-domain resource |

DCI Format 2_5 Enhancements for Semi-static Configuration Scenario 1

In some aspects, in Rel-16 DCI format 2_5, the minimum granularity of soft availability indication is per IAB-DU resource type (D/U/F) in a slot. To support frequency-domain soft resource availability indication for semi-static configuration scenario 1, if frequency-domain H/S/NA is applied per-resource type level, enhancements of DCI format 2_5 in per-resource type granularity are needed.

Figure 11:
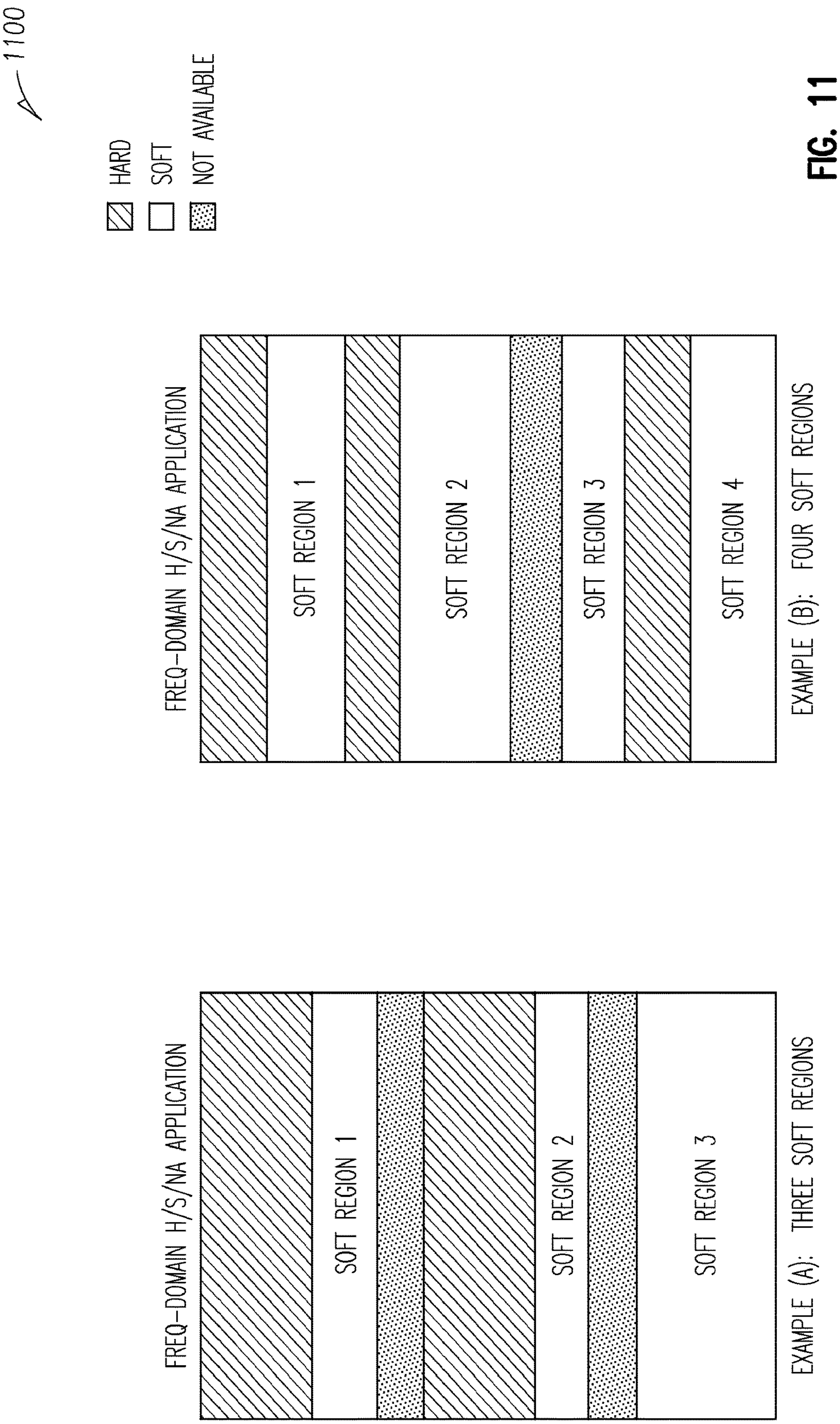
FIG. 11 illustrates semi-static frequency-domain soft regions examples, in accordance with some aspects.

In some aspects, in Rel-16 DCI format 2_5, the resource availability element can take 8 values (0-7) to indicate D/U/F soft availability. In semi-static frequency-domain H/S/NA configuration, there can be multiple soft regions in one frequency-domain H/S/NA application. In FIG. 11, a semi-static frequency-domain configuration of three soft regions is illustrated in example (a) and four soft regions in example (b).

FIG. 11 illustrates diagram 1100 of semi-static frequency-domain soft regions examples, in accordance with some aspects.

In some aspects, the dynamic frequency-domain soft availability indication will be the bitmap availability indication of the soft regions. For example, if three soft regions are defined by semi-static frequency-domain configuration, the dynamic resource availability indication element can also take 8 values (0-7) to indicate three soft regions' availability, as shown in Table 3. In this case, Rel-16 DCI format 2_5 can be reused with different resource availability element interpretation enhancement.

TABLE 3

(Soft availability indication embodiment based on three soft regions for semi-static configuration Scenario 1)

| Value | Meaning |
|---|---|
| 0 | Soft region 1: no indication of availability<br>Soft region 2: no indication of availability<br>Soft region 3: no indication of availability |
| 1 | Soft region 1: indicated available<br>Soft region 2: no indication of availability<br>Soft region 3: no indication of availability |
| 2 | Soft region 1: no indication of availability<br>Soft region 2: indicated available<br>Soft region 3: no indication of availability |

TABLE 3-continued (Soft availability indication embodiment based on three soft regions for semi-static configuration Scenario 1)

| Value | Meaning |
|---|---|
| 3 | Soft region 1: indicated available<br>Soft region 2: indicated available<br>Soft region 3: no indication of availability |
| 4 | Soft region 1: no indication of availability<br>Soft region 2: no indication of availability<br>Soft region 3: indicated available |
| 5 | Soft region 1: indicated available<br>Soft region 2: no indication of availability<br>Soft region 3: indicated available |
| 6 | Soft region 1: no indication of availability<br>Soft region 2: indicated available<br>Soft region 3: indicated available |
| 7 | Soft region 1: indicated available<br>Soft region 2: indicated available<br>Soft region 3: indicated available |

In some aspects, if more than three soft regions are allowed by semi-static frequency-domain configuration, the dynamic resource availability indication element will take more than 8 values and enhancements on DCI format 2_5 can be configured.

For example, if there are four soft regions defined by semi-static frequency-domain H/S/NA configuration, the dynamic resource availability indication element can take 16 values (0-15) to indicate four soft regions' availability, as shown in Table 4.

TABLE 4

(Soft availability indication embodiment based on four soft regions for semi-static configuration Scenario 1)

| Value | Meaning |
|---|---|
| 0 | Soft region 1: no indication of availability<br>Soft region 2: no indication of availability<br>Soft region 3: no indication of availability<br>Soft region 4: no indication of availability |
| 1 | Soft region 1: indicated available<br>Soft region 2: no indication of availability<br>Soft region 3: no indication of availability<br>Soft region 4: no indication of availability |
| 2 | Soft region 1: no indication of availability<br>Soft region 2: indicated available<br>Soft region 3: no indication of availability<br>Soft region 4: no indication of availability |
| 3 | Soft region 1: indicated available<br>Soft region 2: indicated available<br>Soft region 3: no indication of availability<br>Soft region 4: no indication of availability |
| 4 | Soft region 1: no indication of availability<br>Soft region 2: no indication of availability<br>Soft region 3: indicated available<br>Soft region 4: no indication of availability |
| 5 | Soft region 1: indicated available<br>Soft region 2: no indication of availability<br>Soft region 3: indicated available<br>Soft region 4: no indication of availability |
| 6 | Soft region 1: no indication of availability<br>Soft region 2: indicated available<br>Soft region 3: indicated available<br>Soft region 4: no indication of availability |
| 7 | Soft region 1: indicated available<br>Soft region 2: indicated available<br>Soft region 3: indicated available<br>Soft region 4: no indication of availability |
| 8 | Soft region 1: no indication of availability<br>Soft region 2: no indication of availability<br>Soft region 3: no indication of availability<br>Soft region 4: indicated available |

TABLE 4-continued (Soft availability indication embodiment based on four soft regions for semi-static configuration Scenario 1)

| Value | Meaning |
|---|---|
| 9 | Soft region 1: indicated available<br>Soft region 2: no indication of availability<br>Soft region 3: no indication of availability<br>Soft region 4: indicated available |
| 10 | Soft region 1: no indication of availability<br>Soft region 2: indicated available<br>Soft region 3: no indication of availability<br>Soft region 4: indicated available |
| 11 | Soft region 1: indicated available<br>Soft region 2: indicated available<br>Soft region 3: no indication of availability<br>Soft region 4: indicated available |
| 12 | Soft region 1: no indication of availability<br>Soft region 2: no indication of availability<br>Soft region 3: indicated available<br>Soft region 4: indicated available |
| 13 | Soft region 1: indicated available<br>Soft region 2: no indication of availability<br>Soft region 3: indicated available<br>Soft region 4: indicated available |
| 14 | Soft region 1: no indication of availability<br>Soft region 2: indicated available<br>Soft region 3: indicated available<br>Soft region 4: indicated available |
| 15 | Soft region 1: indicated available<br>Soft region 2: indicated available<br>Soft region 3: indicated available<br>Soft region 4: indicated available |

In some aspects, for frequency-domain soft resource availability indication of semi-static configuration scenario 1, enhancements of DCI format 2_5 can be based on the following semi-static configurations:

(a) Whether frequency-domain H/S/NA is applied per-slot level or per-resource type level; and (b) The maximum number of soft regions of one frequency-domain H/S/NA application.

DCI Format 2_5 Enhancements for Semi-Static Configuration Scenario 2

For semi-static configuration scenario 2, since there are three resource types (D/F/U), there can be configured at most three soft regions. In some aspects, the current DCI format 2_5 (resource availability element can take 8 values (0-7) to indicate D/U/F soft availability) can be reused with frequency-domain interpretation enhancement as shown in Table 5.

TABLE 5

(Soft availability indication embodiment for semi-static configuration Scenario 2)

| Value | Indication |
|---|---|
| 0 | No indication of availability for soft RBs |
| 1 | DL soft RBs are indicated available<br>No indication of availability for UL and Flexible soft RBs |
| 2 | UL soft RBs are indicated available<br>No indication of availability for DL and Flexible soft RBs |
| 3 | DL and UL soft RBs are indicated available<br>No indication of availability for Flexible soft RBs |
| 4 | Flexible soft RBs are indicated available<br>No indication of availability for DL and UL soft RBs |

TABLE 5-continued (Soft availability indication embodiment for semi-static configuration Scenario 2)

| Value | Indication |
|---|---|
| 5 | DL and Flexible soft RBs are indicated available<br>No indication of availability for UL soft RBs |
| 6 | UL and Flexible soft RBs are indicated available<br>No indication of availability for DL soft RBs |
| 7 | DL, UL, and Flexible soft RBs are indicated available |

In some aspects, an IAB-DU can be provided with both time-domain H/S/NA and frequency-domain H/S/NA configuration. For a given resource, either time-domain H/S/NA or frequency-domain H/S/NA can be applied.

In some aspects, for semi-static configuration scenario 1, the following configurations can be used: (a) frequency-domain H/S/NA with time-domain D/U/F can be configured. In some aspects, frequency-domain H/S/NA can divide DU's bandwidth into hard regions/soft regions/not available regions, with each region composed of a set of N RBs (N can be 4, 8, 16, or larger). (b) Per-slot level frequency-domain H/S/NA application; and (c) Per-resource type level frequency-domain H/S/NA application.

In some aspects, semi-static configuration scenario 2 can include frequency-domain H/S/NA with frequency-domain D/U/F. In some aspects, the D/U/F resource type is configured in the frequency domain and with a granularity of a set of N RBs (N can be 4, 8, 16, or larger). It can have a D/F/U pattern or a U/F/D pattern. In some aspects, frequency-domain H/S/NA attributes are provided per-resource type.

In some aspects, semi-static H/S/NA configuration (scenario 1 or scenario 2) in the IAB-DU frequency domain can be fulfilled by F1AP signaling. There can be several options to enhance the F1AP signaling for H/S/NA configuration: (a) Option 1: Enhancement of the existing GNB-DU RESOURCE CONFIGURATION message; (b) Option 2: Enhancement of the existing gNB-DU Cell Resource Configuration IE; and (c) Option 3: Introduction of a new dedicated F1AP message/IE.

In some aspects, DCI format 2_5 enhancements for semi-static configuration scenario 1 are based on the following semi-static configurations:

(a) Whether frequency-domain H/S/NA is applied per-slot level or per-resource type level; and (b) The maximum number of soft regions of one frequency-domain H/S/NA application:

(b.1) If the maximum number of soft regions is less or equal to 3, the current DCI format 2_5 can be reused with frequency-domain interpretation enhancement as shown in Table 3.

(b.2) If the maximum number of soft regions is larger than 3, enhancements on DCI format 2-5 are needed (an example of 4 soft regions is shown in Table 4).

In some aspects, DCI format 2_5 enhancements for semi-static configuration scenario 2 can be configured. In some aspects, for semi-static configuration scenario 2, current DCI format 2_5 can be reused with frequency-domain interpretation enhancement as shown in Table 5.

Figure 12:
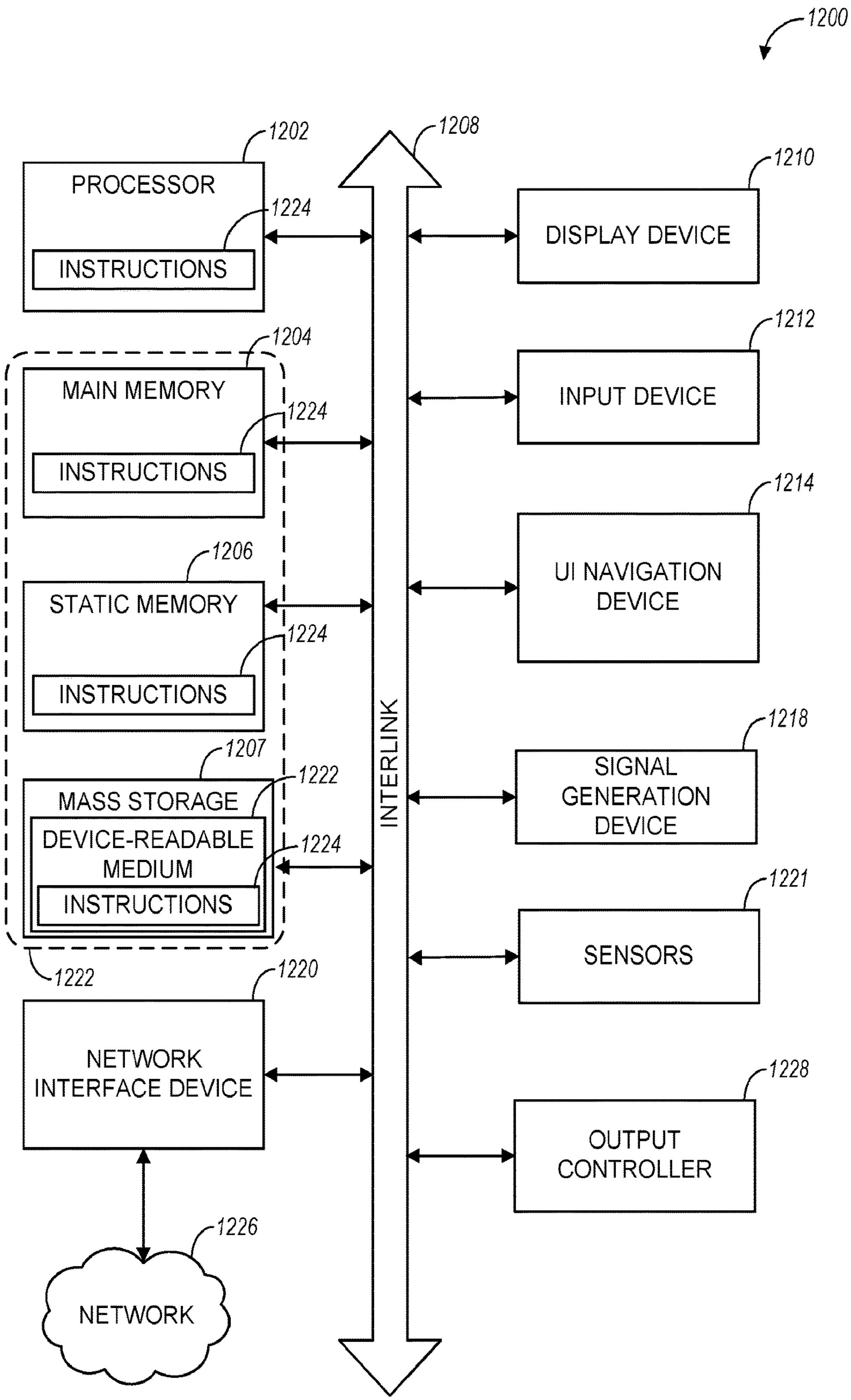
FIG. 12 illustrates a block diagram of a communication device such as an evolved Node-B (eNB), a new generation Node-B (gNB) (or another RAN node), an access point (AP), a wireless station (STA), a mobile station (MS), or a user equipment (UE), in accordance with some aspects.

FIG. 12 illustrates a block diagram of a communication device such as an evolved Node-B (eNB), a new generation Node-B (gNB) (or another RAN node), an access point (AP), a wireless station (STA), a mobile station (MS), or a user equipment (UE), in accordance with some aspects and to perform one or more of the techniques disclosed herein. In alternative aspects, the communication device 1200 may operate as a standalone device or may be connected (e.g., networked) to other communication devices.

Circuitry (e.g., processing circuitry) is a collection of circuits implemented in tangible entities of the device 1200 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1200 follow.

In some aspects, the device 1200 may operate as a standalone device or may be connected (e.g., networked) to other devices. In a networked deployment, the communication device 1200 may operate in the capacity of a server communication device, a client communication device, or both in server-client network environments. In an example, the communication device 1200 may act as a peer communication device in a peer-to-peer (P2P) (or other distributed) network environment. The communication device 1200 may be a UE, eNB, PC, a tablet PC, an STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 1200 may include a hardware processor 1202 (e.g., a central processing unit (CPU), a graphics processing unit (GPU), a hardware processor core, or any combination thereof), a main memory 1204, a static memory 1206, and a storage device 1207 (e.g., hard drive, tape drive, flash storage, or other block or storage devices), some or all of which may communicate with each other via an interlink (e.g., bus) 1208.

The communication device 1200 may further include a display device 1210, an alphanumeric input device 1212 (e.g., a keyboard), and a user interface (UI) navigation device 1214 (e.g., a mouse). In an example, the display device 1210, input device 1212, and UI navigation device 1214 may be a touchscreen display. The communication device 1200 may additionally include a signal generation device 1218 (e.g., a speaker), a network interface device 1220, and one or more sensors 1221, such as a global positioning system (GPS) sensor, compass, accelerometer, or another sensor. The communication device 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1207 may include a communication device-readable medium 1222, on which is stored one or more sets of data structures or instructions 1224 (e.g., software) embodying or utilized by any one or more of the techniques or functions described herein. In some aspects, registers of the processor 1202, the main memory 1204, the static memory 1206, and/or the storage device 1207 may be, or include (completely or at least partially), the device-readable medium 1222, on which is stored the one or more sets of data structures or instructions 1224, embodying or utilized by any one or more of the techniques or functions described herein. In an example, one or any combination of the hardware processor 1202, the main memory 1204, the static memory 1206, or the mass storage 1207 may constitute the device-readable medium 1222.

As used herein, the term "device-readable medium" is interchangeable with "computer-readable medium" or "machine-readable medium". While the communication device-readable medium 1222 is illustrated as a single medium, the term "communication device-readable medium" may include a single medium or multiple media (e.g., a centralized or distributed database, and/or associated caches and servers) configured to store the one or more instructions 1224. The term "communication device-readable medium" is inclusive of the terms "machine-readable medium" or "computer-readable medium", and may include any medium that is capable of storing, encoding, or carrying instructions (e.g., instructions 1224) for execution by the communication device 1200 and that causes the communication device 1200 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

Instructions 1224 may further be transmitted or received over a communications network 1226 using a transmission medium via the network interface device 1220 utilizing any one of a number of transfer protocols. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input-multiple-output (SIMO), MIMO, or multiple-input-single-output (MISO) techniques. In some examples, the network interface device 1220 may wirelessly communicate using Multiple User MIMO techniques.

The term "transmission medium" shall be taken to include any intangible medium that is capable of storing, encoding, or carrying instructions for execution by the communication device 1200, and includes digital or analog communications signals or another intangible medium to facilitate communication of such software. In this regard, a transmission medium in the context of this disclosure is a device-readable medium.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Described implementations of the subject matter can include one or more features, alone or in combination as illustrated below by way of examples.

Example 1 is an apparatus for an Integrated Access and Backhaul (IAB) node, the apparatus comprising: processing circuitry, wherein to configure the IAB node for resource availability indication in an IAB network, the processing circuitry is to: decode at a distributed unit (DU) function of the IAB node, configuration signaling received from a central unit (CU) function of an IAB donor node, the configuration signaling to configure a frequency-domain hard, soft, and not available (H/S/NA) resource application for a plurality of resource types; decode at a mobile termination (MT) function of the IAB node, downlink control information (DCI) received from a parent DU (P-DU) function of a parent IAB node, the DCI including an availability indicator for at least one soft resource region associated with the frequency-domain H/S/NA resource application; and configure a downlink transmission by the DU function of the IAB node to a child MT (C-MT) function of a child IAB node or an uplink reception from a child DU (C-DU) function of the child IAB node using the at least one soft resource region based on the availability indicator; and memory coupled to the processing circuitry and configured to store the configuration signaling and the DCI.

In Example 2, the subject matter of Example 1 includes subject matter where the DCI is a DCI format 2_5.

In Example 3, the subject matter of Examples 1-2 includes subject matter where the processing circuitry is to: decode the DCI to determine at least one hard resource region, the at least one soft resource region, and at least one not available resource region of a plurality of resource regions, each of the plurality of resource regions associated with one of the plurality of resource types.

In Example 4, the subject matter of Examples 1-3 includes subject matter where the plurality of resource types includes a downlink resource type, a flexible resource type, and an uplink resource type, and wherein the processing circuitry is to: configure the downlink transmission to the C-MT function of the child IAB node when the at least one soft resource region is of the downlink resource type, and the availability indicator indicates the at least one soft resource region is available for use by the DU function of the IAB node.

In Example 5, the subject matter of Example 4 includes subject matter where the processing circuitry is to: configure the uplink reception from the C-DU function of the child IAB node when the at least one soft resource region is of the uplink resource type, and the availability indicator indicates the at least one soft resource region is available for use by the DU function of the IAB node.

In Example 6, the subject matter of Examples 1-5 includes subject matter where the processing circuitry is to: decode the DCI to determine whether the frequency-domain H/S/NA resource application is applied on a per-slot level or a per-resource-type level.

In Example 7, the subject matter of Examples 1-6 includes subject matter where the processing circuitry is to: decode the DCI to determine a maximum number of soft regions within the frequency-domain H/S/NA resource application.

In Example 8, the subject matter of Example 7 includes subject matter where the processing circuitry is to: decode the availability indicator as an integer value between 0 and 7 when the maximum number of soft regions is less than or equal to 3, the integer value indicating availability for each of the maximum number of resource regions.

In Example 9, the subject matter of Examples 7-8 includes subject matter where the processing circuitry is to: decode the availability indicator as an integer value between 0 and 15 when the maximum number of soft regions is greater than 3, the integer value indicating availability for each of the maximum number of resource regions.

In Example 10, the subject matter of Examples 1-9 includes subject matter where the plurality of resource types includes a downlink resource type, a flexible resource type, and an uplink resource type, and wherein the processing circuitry is to: configure the frequency-domain H/S/NA resource application with a time-domain application for the plurality of resource types.

In Example 11, the subject matter of Examples 1-10 includes subject matter where the plurality of resource types includes a downlink resource type, a flexible resource type, and an uplink resource type, and wherein the processing circuitry is to: configure the frequency-domain H/S/NA resource application with a frequency-domain application for the plurality of resource types.

In Example 12, the subject matter of Examples 1-11 includes, transceiver circuitry coupled to the processing circuitry; and one or more antennas coupled to the transceiver circuitry.

Example 13 is a computer-readable storage medium that stores instructions for execution by one or more processors of an Integrated Access and Backhaul (IAB) node, the instructions to configure the IAB node for resource availability indication in an IAB network, and to cause the IAB node to: decode at a distributed unit (DU) function of the IAB node, configuration signaling received from a central unit (CU) function of an IAB donor node, the configuration signaling to configure a frequency-domain hard, soft, and not available (H/S/NA) resource application for a plurality of resource types; decode at a mobile termination (MT) function of the IAB node, downlink control information (DCI) received from a parent DU (P-DU) function of a parent IAB node, the DCI including an availability indicator for at least one soft resource region associated with the frequency-domain H/S/NA resource application; and configure a downlink transmission by the DU function of the IAB node to a child MT (C-MT) function of a child IAB node or an uplink reception from a child DU (C-DU) function of the child IAB node using the at least one soft resource region based on the availability indicator.

In Example 14, the subject matter of Example 13 includes subject matter where the instructions further cause the IAB node to decode the DCI to determine at least one hard resource region, the at least one soft resource region, and at least one not available resource region of a plurality of resource regions, each of the plurality of resource regions associated with one of the plurality of resource types.

In Example 15, the subject matter of Examples 13-14 includes subject matter where the plurality of resource types includes a downlink resource type, a flexible resource type, and an uplink resource type, and wherein the instructions further cause the IAB node to: configure the downlink transmission to the C-MT function of the child IAB node when the at least one soft resource region is of the downlink resource type, and the availability indicator indicates the at least one soft resource region is available for use by the DU function of the IAB node.

In Example 16, the subject matter of Example 15 includes subject matter where the instructions further cause the IAB node to: configure the uplink reception from the C-DU function of the child IAB node when the at least one soft resource region is of the uplink resource type, and the availability indicator indicates the at least one soft resource region is available for use by the DU function of the IAB node.

In Example 17, the subject matter of Examples 13-16 includes subject matter where the instructions further cause the IAB node to: decode the DCI to determine whether the frequency-domain H/S/NA resource application is applied on a per-slot level or a per-resource-type level.

In Example 18, the subject matter of Examples 13-17 includes subject matter where the instructions further cause the IAB node to decode the DCI to determine a maximum number of soft regions within the frequency-domain H/S/NA resource application; decode the availability indicator as an integer value between 0 and 7 when the maximum number of soft regions is less than or equal to 3, the integer value indicating availability for each of the maximum number of resource regions; and decode the availability indicator as an integer value between 0 and 15 when the maximum number of soft regions is greater than 3, the integer value indicating availability for each of the maximum number of resource regions.

Example 19 is a computer-readable storage medium that stores instructions for execution by one or more processors of a parent Integrated Access and Backhaul (IAB) node, the instructions to configure the parent IAB node for resource availability indication in an IAB network, and to cause the parent IAB node to: encode at a parent distributed unit (P-DU) function of the parent IAB node, downlink control information (DCI) for transmission to a mobile termination (MT) function of an IAB node, the DCI including an availability indicator for at least one soft resource region associated with a frequency-domain hard, soft, and not available (H/S/NA) resource application for a plurality of resource types, the frequency-domain H/S/NA resource application configured by signaling originating from a central unit (CU) function of an IAB donor node; and the DCI further configuring a downlink transmission by a distributed unit (DU) function of the IAB node to a child mobile termination (C-MT) function of a child IAB node or an uplink reception from a child DU (C-DU) function of the child IAB node using the at least one soft resource region based on the availability indicator.

In Example 20, the subject matter of Example 19 includes,

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus for an Integrated Access and Backhaul (IAB) node, the apparatus comprising:
  - processing circuitry, wherein to configure the IAB node for resource availability indication in an IAB network, the processing circuitry is to:
    - decode at a distributed unit (DU) function of the IAB node, configuration signaling received from a central unit (CU) function of an IAB donor node, and the configuration signaling to configure a frequency-domain hard, soft, and not available (H/S/NA) resource application for a plurality of resource types;
    - decode at a mobile termination (MT) function of the IAB node, downlink control information (DCI) received from a parent DU (P-DU) function of a parent IAB node, the DCI including an availability indicator for at least one soft resource region associated with the frequency-domain H/S/NA resource application; and
    - configure a downlink transmission by the DU function of the IAB node to a child MT (C-MT) function of a child IAB node or an uplink reception from a child DU (C-DU) function of the child IAB node using the at least one soft resource region based on the availability indicator; and
  - memory coupled to the processing circuitry and configured to store the configuration signaling and the DCI.

2. The apparatus of claim 1, wherein the DCI is a DCI format 2_5.

3. The apparatus of claim 1, wherein the processing circuitry is to:
  - decode the DCI to determine at least one hard resource region, the at least one soft resource region, and at least one not available resource region of a plurality of resource regions, each of the plurality of resource regions associated with one of the plurality of resource types.

4. The apparatus of claim 1, wherein the plurality of resource types includes a downlink resource type, a flexible resource type, and an uplink resource type, and wherein the processing circuitry is to:
  - configure the downlink transmission to the C-MT function of the child IAB node when the at least one soft resource region is of the downlink resource type, and the availability indicator indicates the at least one soft resource region is available for use by the DU function of the IAB node.

5. The apparatus of claim 4, wherein the processing circuitry is to:
  - configure the uplink reception from the C-DU function of the child IAB node when the at least one soft resource region is of the uplink resource type, and the availability indicator indicates the at least one soft resource region is available for use by the DU function of the IAB node.

6. The apparatus of claim 1, wherein the processing circuitry is to:
  - decode the DCI to determine whether the frequency-domain H/S/NA resource application is applied on a per-slot level or a per-resource-type level.

7. The apparatus of claim 1, wherein the processing circuitry is to:
  - decode the DCI to determine a maximum number of soft regions within the frequency-domain H/S/NA resource application.

8. The apparatus of claim 7, wherein the processing circuitry is to:
  - decode the availability indicator as an integer value between 0 and 7 when the maximum number of soft regions is less than or equal to 3, the integer value indicating availability for each of the maximum number of resource regions.

9. The apparatus of claim 7, wherein the processing circuitry is to:
  - decode the availability indicator as an integer value between 0 and 15 when the maximum number of soft regions is greater than 3, the integer value indicating availability for each of the maximum number of resource regions.

10. The apparatus of claim 1, wherein the plurality of resource types includes a downlink resource type, a flexible resource type, and an uplink resource type, and wherein the processing circuitry is to:

configure the frequency-domain H/S/NA resource application with a time-domain application for the plurality of resource types.

11. The apparatus of claim 1, wherein the plurality of resource types includes a downlink resource type, a flexible resource type, and an uplink resource type, and wherein the processing circuitry is to:

configure the frequency-domain H/S/NA resource application with a frequency-domain application for the plurality of resource types.

12. The apparatus of claim 1, further comprising:

transceiver circuitry coupled to the processing circuitry; and one or more antennas coupled to the transceiver circuitry.

13. A non-transitory computer-readable storage medium that stores instructions for execution by one or more processors of an Integrated Access and Backhaul (IAB) node, the instructions to configure the IAB node for resource availability indication in an IAB network, and to cause the IAB node to:

decode at a distributed unit (DU) function of the IAB node, configuration signaling received from a central unit (CU) function of an IAB donor node, and the configuration signaling to configure a frequency-domain hard, soft, and not available (H/S/NA) resource application for a plurality of resource types;

decode at a mobile termination (MT) function of the IAB node, downlink control information (DCI) received from a parent DU (P-DU) function of a parent IAB node, the DCI including an availability indicator for at least one soft resource region associated with the frequency-domain H/S/NA resource application; and configure a downlink transmission by the DU function of the IAB node to a child MT (C-MT) function of a child IAB node or an uplink reception from a child DU (C-DU) function of the child IAB node using the at least one soft resource region based on the availability indicator.

14. The non-transitory computer-readable storage medium of claim 13, wherein the instructions further cause the IAB node to:

decode the DCI to determine at least one hard resource region, the at least one soft resource region, and at least one not available resource region of a plurality of resource regions, each of the plurality of resource regions associated with one of the plurality of resource types.

15. The non-transitory computer-readable storage medium of claim 13, wherein the plurality of resource types includes a downlink resource type, a flexible resource type, and an uplink resource type, and wherein the instructions further cause the IAB node to:

configure the downlink transmission to the C-MT function of the child IAB node when the at least one soft resource region is of the downlink resource type, and the availability indicator indicates the at least one soft resource region is available for use by the DU function of the IAB node.

16. The non-transitory computer-readable storage medium of claim 15, wherein the instructions further cause the IAB node to:

configure the uplink reception from the C-DU function of the child IAB node when the at least one soft resource region is of the uplink resource type, and the availability indicator indicates the at least one soft resource region is available for use by the DU function of the IAB node.

17. The non-transitory computer-readable storage medium of claim 13, wherein the instructions further cause the IAB node to:

decode the DCI to determine whether the frequency-domain H/S/NA resource application is applied on a per-slot level or a per-resource-type level.

18. The non-transitory computer-readable storage medium of claim 13, wherein the instructions further cause the IAB node to:

decode the DCI to determine a maximum number of soft regions within the frequency-domain H/S/NA resource application;

decode the availability indicator as an integer value between 0 and 7 when the maximum number of soft regions is less than or equal to 3, the integer value indicating availability for each of the maximum number of resource regions; and decode the availability indicator as an integer value between 0 and 15 when the maximum number of soft regions is greater than 3, the integer value indicating availability for each of the maximum number of resource regions.

19. A non-transitory computer-readable storage medium that stores instructions for execution by one or more processors of a parent Integrated Access and Backhaul (IAB) node, the instructions to configure the parent IAB node for resource availability indication in an IAB network, and to cause the parent IAB node to:

encode at a parent distributed unit (P-DU) function of the parent IAB node, downlink control information (DCI) for transmission to a mobile termination (MT) function of an IAB node, the DCI including an availability indicator for at least one soft resource region associated with a frequency-domain hard, soft, and not available (H/S/NA) resource application for a plurality of resource types, the frequency-domain H/S/NA resource application configured by signaling originating from a central unit (CU) function of an IAB donor node; and the DCI further configures a downlink transmission by a distributed unit (DU) function of the IAB node to a child mobile termination (C-MT) function of a child IAB node or an uplink reception from a child DU (C-DU) function of the child IAB node using the at least one soft resource region based on the availability indicator.

20. The non-transitory computer-readable storage medium of claim 19, wherein the DCI is a DCI format 2_5.

* * * * *